United States Patent
Mualem et al.

(10) Patent No.: US 7,463,590 B2
(45) Date of Patent: Dec. 9, 2008

(54) SYSTEM AND METHOD FOR THREAT DETECTION AND RESPONSE

(75) Inventors: Hezi I. Mualem, Atlanta, GA (US); Nick Black, Atlanta, GA (US); John Molnar, Lilburn, GA (US); Jason Lunz, Doraville, GA (US)

(73) Assignee: Reflex Security, Inc., Atlanta, GA (US)

( * ) Notice: Subject to any disclaimer, the term of this patent is extended or adjusted under 35 U.S.C. 154(b) by 874 days.

(21) Appl. No.: 10/896,461

(22) Filed: Jul. 22, 2004

(65) Prior Publication Data

US 2005/0018618 A1 Jan. 27, 2005

Related U.S. Application Data

(60) Provisional application No. 60/490,018, filed on Jul. 25, 2003.

(51) Int. Cl.
*H04L 12/26* (2006.01)
*G06F 11/00* (2006.01)

(52) U.S. Cl. .......................... 370/241; 726/23
(58) Field of Classification Search ................. 370/241, 370/242, 252, 389, 392; 726/1, 13, 22–30; 713/153, 168, 176–178, 187–188, 200, 201, 713/202, 203
See application file for complete search history.

(56) References Cited

U.S. PATENT DOCUMENTS

| | | | |
|---|---|---|---|
| 5,491,752 A | 2/1996 | Kaufman et al. | |
| 5,892,903 A | 4/1999 | Klaus | |
| 6,088,804 A | 7/2000 | Hill et al. | |
| 6,275,942 B1 | 8/2001 | Bernhard et al. | |
| 6,279,113 B1 | 8/2001 | Vaidya | |
| 6,301,668 B1 | 10/2001 | Gleichauf et al. | |
| 6,363,489 B1 | 3/2002 | Comay et al. | |
| 6,460,141 B1 | 10/2002 | Olden | |
| 6,477,651 B1 | 11/2002 | Teal | |
| 6,487,666 B1 | 11/2002 | Shanklin et al. | |
| 6,502,135 B1 | 12/2002 | Munger et al. | |
| 6,513,122 B1 | 1/2003 | Magdych et al. | |
| 6,584,569 B2 | 6/2003 | Reshef et al. | |
| 7,051,369 B1* | 5/2006 | Baba | 726/23 |
| 7,093,299 B1* | 8/2006 | Kamijo et al. | 726/29 |
| 2003/0145226 A1* | 7/2003 | Bruton et al. | 713/201 |
| 2003/0236995 A1* | 12/2003 | Fretwell, Jr. | 713/200 |
| 2004/0010718 A1* | 1/2004 | Porras et al. | 713/201 |
| 2004/0151188 A1* | 8/2004 | Maveli et al. | 370/398 |
| 2004/0215976 A1* | 10/2004 | Jain | 713/201 |
| 2004/0221176 A1* | 11/2004 | Cole | 713/201 |

OTHER PUBLICATIONS

"Protecting the Network from Denial of Service Attacks: The Captus Networks TraP Technology", Captus Networks—A Captus Network White Paper, Aug. 2001 v6.2.

* cited by examiner

*Primary Examiner*—Kwang B. Yao
*Assistant Examiner*—Tung Q Tran
(74) *Attorney, Agent, or Firm*—Hunton & Williams

(57) ABSTRACT

In accordance with varying embodiments of the invention, systems, devices and methods for analyzing a network packet received from a remote source and destined for a network resource, the network packet having associated packet data, and for identifying a plurality of network threats are disclosed.

56 Claims, 10 Drawing Sheets

Fig. 9

SYSTEM AND METHOD FOR THREAT DETECTION AND RESPONSE

This application claims the benefit of U.S. Provisional Application No. 60/490,018 filed on Jul. 25, 2003, the contents of which are incorporated by reference herein in their entirety.

BACKGROUND OF THE INVENTION

The invention relates generally to systems and methods for threat detection and response in networked environments.

There are many different types of attacks that hackers employ to gain unlawful entry to networked systems these days. For example, a denial of service (DoS) attack is an assault on a network that floods the network with a large number of requests such that regular traffic is either slowed or completely interrupted. Unlike a virus or worm, which can cause severe damage to databases, a DoS attack interrupts network service for some period. A distributed denial of service (DDOS) attack uses multiple computers throughout a network to slow or interrupt traffic on a network. The attacker infects a number of computers on the network, known as "zombies," which when called upon by the hacker work together to send out bogus messages to the network, thereby increasing the amount of phony traffic.

Another type of attack is a port scan attack. This type of attack involves sending queries to Internet servers (hosts) in order to obtain information about their services and level of security. On Internet hosts, there are standard port numbers for each type of service. Port scanning is sometimes done to find out if a network can be compromised. A SYN flood attack is an assault on a network that prevents a TCP/IP server from servicing other users. It is accomplished by not sending the final acknowledgment to the server's SYN-ACK response (SYNchronize-ACKnowledge) in the handshaking sequence, which causes the server to keep signaling until it eventually times out. The source address from the client is, of course, counterfeit. SYN flood attacks can either overload the server or cause it to crash.

Accordingly, the invention provides systems and methods for detecting and responding to network threats, that overcome the disadvantages of known systems and methods while offering features not present in known systems and methods. Although certain deficiencies in the related art are described in this background discussion and elsewhere, it will be understood that these deficiencies were not necessarily heretofore recognized or known as deficiencies. Furthermore, it will be understood that, to the extent that one or more of the deficiencies described herein may be found in an embodiment of the claimed invention, the presence of such deficiencies does not detract from the novelty or non-obviousness of the invention or remove the embodiment from the scope of the claimed invention.

SUMMARY OF THE INVENTION

In accordance with a first embodiment of the invention, a method for analyzing a network packet received from a remote source and destined for a network resource, the network packet having associated packet data, and for identifying a plurality of network threats is disclosed. The method comprises comparing the packet data to a predetermined set of protocol anomalies, each protocol anomaly indicative of at least one of the plurality of network threats, comparing the packet data to a predetermined set of threat signatures, each threat signature indicative of at least one of the plurality of network threats, comparing a first port weighting for the network resource to a default port weighting, the first port weighting generated in part based on the packet data, comparing a first source weighting for the remote source to a default source weighting, the first source weighting generated in part based on the packet data, comparing the packet data to a predetermined set of permissions, determining that the network packet is associated with an existing network threat based on at least one of the comparison of the packet data to the predetermined set of protocol anomalies, the comparison of the packet data to the predetermined set of threat signatures, the comparison of the first port weighting to the default port weighting, the comparison of the first source weighting to the default source weighting, the comparison of the packet data to the predetermined set of permissions, and taking at least one of a plurality of actions in response to the existing network threat In accordance with a second embodiment of the invention, a system for analyzing a network packet received from a remote source and destined for a network resource, the network packet having associated packet data, and for identifying a plurality of network threats is disclosed. The system comprises a first portion adapted for comparing the packet data to a predetermined set of protocol anomalies, each protocol anomaly indicative of at least one of the plurality of network threats, a second portion adapted for comparing the packet data to a predetermined set of threat signatures, each threat signature indicative of at least one of the plurality of network threats, a third portion adapted for comparing a first port weighting for the network resource to a default port weighting, the first port weighting generated in part based on the packet data, a fourth portion adapted for comparing a first source weighting for the remote source to a default source weighting, the first source weighting generated in part based on the packet data, a fifth portion adapted for comparing the packet data to a predetermined set of permissions, a sixth portion adapted for determining that the network packet is associated with an existing network threat based on at least one of the comparison of the packet data to the predetermined set of protocol anomalies, the comparison of the packet data to the predetermined set of threat signatures, the comparison of the first port weighting to the default port weighting, the comparison of the first source weighting to the default source weighting, the comparison of the packet data to the predetermined set of permissions, and a seventh portion adapted for taking at least one of a plurality of actions in response to the existing network threat.

In accordance with a third embodiment of the invention, a device for analyzing a network packet received from a remote source and destined for a network resource, the network packet having associated packet data, and for identifying a plurality of network threats is disclosed.

BRIEF DESCRIPTION OF THE DRAWINGS

The present invention can be more fully understood by reading the following detailed description of the presently preferred embodiments together with the accompanying drawings, in which like reference indicators are used to designate like elements, and in which:

FIG. 9 is an illustrative user interface for the threat management system of FIG. 2 in accordance with one embodiment of the invention.

DETAILED DESCRIPTION OF PREFERRED EMBODIMENTS

In accordance with various embodiments of the invention, methods, systems and devices for detecting and responding to network threats are disclosed hereinafter.

Figure 1:
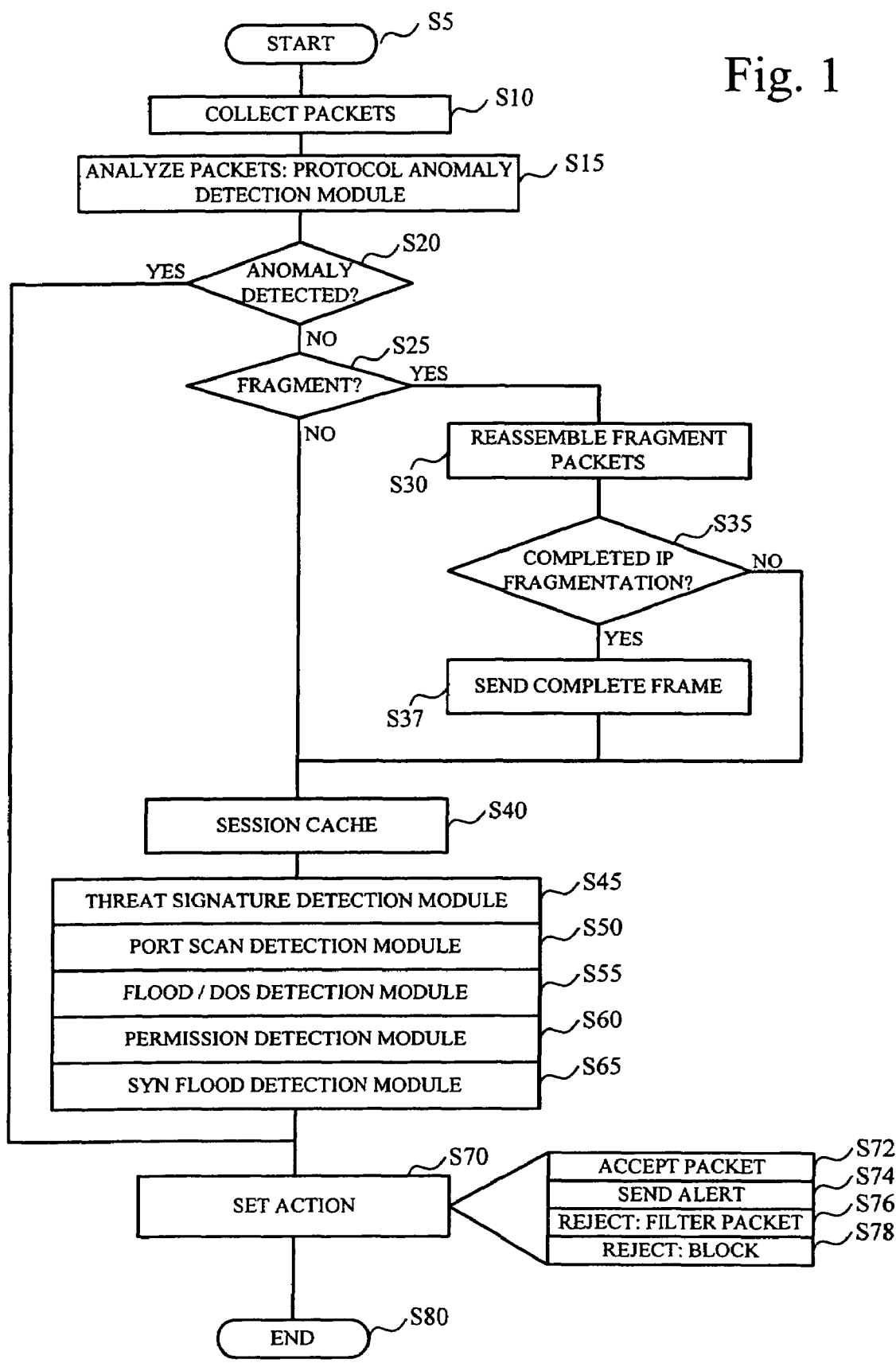
FIG. 1 is a flowchart illustrating a method of detecting and responding to network threats in accordance with one embodiment of the invention.

FIG. 1 is a flowchart illustrating a method of detecting and responding to network intrusions in accordance with one embodiment of the invention. As shown in FIG. 1, the threat detection and response process begins in step S5. Then, in step S10, network packets are collected from the network. It should be appreciated that various configurations of threat detection systems and devices for examining network traffic are described below. These systems and devices receive the network traffic stream destined for the network devices the threat detection devices have been deployed to protect. In at least one embodiment of the invention, a packet collector (utilizing NAPI network drivers) moves packets from the physical network and stores them for analysis by the various threat modules of the threat detection system. Once the network packets have been collected, the process passes to step S15.

In step S15, the network packets that were collected are first analyzed for both conformance to network RFC's and reasonable parameter settings. In at least one embodiment, this analysis is performed by a protocol anomaly detection module.

It should be appreciated that many attacks involve simply sending packets with improper or unreasonable structures or values that have malicious effects on target systems. Additionally, attackers often try to evade intrusion detection systems by taking advantage of legal but unreasonable use of RFC protocols.

The protocol anomaly detection module looks for a number of anomalies, including but not limited to, a packet with Ethernet protocol of ARP that is not large enough to contain an ARP Header; an ARP packet that is not large enough to carry its advertised data; a packet with Ethernet protocol of IP that is not large enough to contain an IP header; an IP packet that is not large enough to carry its advertised header; an IP packet having a header that is too small; an IP packet that is not large enough to carry its advertised data; an IP fragment having a length of 0; an IP fragment having an offset greater than 0 set the DF bit; an IP fragment that does not have MF bit set, but a later fragment in the datagram has already been seen; an IP fragment that would result in datagram in excess of 65535 bytes; an IP fragment that overlaps another fragment in the datagram; a packet with IP protocol of TCP that is not large enough to contain a TCP header; a TCP packet that is not large enough to carry its advertised header; a TCP packet that is not large enough to carry its advertised data; a packet with IP protocol of UDP that is not large enough to contain an UDP header; a UDP packet that is not large enough to carry its advertised data; a packet with IP protocol of ICMP that is not large enough to contain an ICMP header; a packet with IP protocol of IGMP that is not large enough to contain an IGMP header; an ICMP reply that is not large enough to include previous IP header; an ICMP reply that is not large enough to include previous first 64 bytes of IP datagram; an IP fragment that set both DF and MF bits; an IP fragment breaks up the TCP header; an IP fragment that set MF bit, but the payload length was not a multiple of 8; an IP fragment that extends the datagram past a previous fragment which had lacked the MF bit; an IP fragment that overlaps a previous fragment, and changes the data; an IP packet that has an invalid checksum.

Following the analysis by the protocol anomaly detection module in step S15, the system determines whether any network packets had anomalies in step S20. If any anomalies are detected, the process passes to step S70, wherein the system determines the action that must be taken with the offending network packet. For those network packets that conform to network RFCs and other administrative settings, the process passes to step S25.

If the network packets are fragments, the process passes to step S30, wherein the process of reassembling fragments begins. In step S35, the system determines whether the IP fragmentation has been completed for a given fragment. If not, the fragment itself is forwarded to the session cache in step S40 for individual analysis. In addition, when reassembly is completed, the completed frame is forwarded in step S37 to the session cache for aggregate analysis.

The network packets that are received in from the network and that are not discarded after the analysis of the protocol anomaly detection module, are stored in the session cache in step S40 for analysis by the individual threat analysis modules. The session cache retains the state of the network traffic, and provides a unified rubric for its introduction, referencing and termination. The session subsystem also tracks each connection on the network. Information such as source, destination, and session state are shared between all analysis modules. By sharing this same information across all modules, the threat detection system's analysis modules can more accurately detect threats and reduce false positives.

When packets are placed in the session cache, two fields are added to the definition of an ethpacket: tracked_session and session_class. The former is a union of various session types, while the latter is an enumeration of those types plus an "untracked" type indicating that this packet has no session cache information tied to it (in the instance, for example, of ppp packets). After a call to track_sessions_pre( ) with a valid ethpacket e, any value in e->type other than UNKNOWN guarantees that the corresponding union member in e->session is a valid session cache entry, pointing to valid hosts. In at least one embodiment, TCP, UDP, ICMP and ARP are tracked. It is of note that while each maintains their own pool of specific session types, all share a common pool of IP's (source and dest for TCP, UDP and ICMP; query/response for ARP), and with no type being shown priority (no dynamic allocations are done within the session cache). Instead, init- _session_tracking( ) sets up large ring buffers that can be either normally or abnormally reclaimed. If the packet is trackable, e->type is set, the protocol-specific pretracking function is called, and a time check is performed against the iphosts which make up the session to see if timed counters should be reset. If the packet was an IP fragment, a call is made into the fragment reassembly layer. Upon a datagram being reassembled, a recursive call is made back into track_sessions_pre( ). Otherwise, the e→type is set to fragment, and analysis continues.

As described above, the collection of IP hosts are shared. Each pretracker acquires the iphost(s) it shall reference via the call procure_session_host( ), taking as its argument a host byte order IP address. Actively used iphosts are hashed to a large number of buckets (iphost_hash), and retain pointers to the previous entry in the hash (prev, next), of which prev is guaranteed to be non-NULL (the first entry's prev field points to an actual pointer in the iphost_hash structure). If the proper iphost is not found, a new one is created, using the oldest entry in the ring buffer (recycling it if necessary). In these embodiments, the iphost is moved to the front of the hash, and to the front of the ring buffer (iphosts carry older and newer pointers, which are guaranteed to maintain an ordering of the ring buffer). The pretrackers all then search these iphosts for an appropriate session (in the case of TCP, UDP and ICMP, where two iphosts are used per session, the iphost with fewer sessions is searched—each iphost involved has a pointer to the session). A packet is considered part of a preexisting session if the following criteria are met: for TCP and UDP, the quintuple defining a session consists of source and destination IP addresses and transport-layer ports, plus the protocol. A packet matches a session if source addr and source port equal one addr & port pair in the session, and dest addr with dest port match another. For ICMP, a packet matches a session if the ICMP type & code are the same, as well as the source and destination addresses, or if the source and destination IP addresses are reversed and the type & code is considered a reply to the original (i.e., echo (type 8) is replied to by echo reply (type 0)). For ARP, a packet matches a session if either it requests or replies for the same IP.

The session cache uses certain data structures. For example, iphosts (an IP_POOL_COUNT-membered array, iphost_pool[ ]) serve as the actual store of iphost structures. Oldest_iphost is pointed at the "back" of the array (each n takes as its->older value upon initialization the array element indexed by n+1), and newest_iphost at the front (index 0). iphost_hash[ ], of IP_HASH_SIZE, hashes iphost structures based on a folding hash. When an iphost is requested via procure_session_host( ), this hash (chained) is walked. If no corresponding iphost is found, oldest_iphost is pulled from the back of the LRU and passed through recycle_iphost( ). Either way, the found iphost structure is moved to the front of the hash chain, and promoted to newest_iphost.

TCP and UDP session entries generally work in the same fashion as iphosts. Their hashes are based on a combination of IP addresses and ports, however, and their calls to procure_session_host( ) can result in the TCP/UDP LRU's being modified (an iphost can be recycled, reinserting any of its TCP/UDP members into the back of their respective LRU's). To check for a match, all four components need be checked, rather than the 1 in an iphost check. ICMP operates in the older style, where iphosts are first discovered using procure_session_host( ), then their own lists of ICMP entries are walked. If an ICMP session must be recycled, it simply dis-associates itself from the containing iphosts, rather than actually recycling them. This ensures that no iphost can be recycled which has already been procured earlier.

The packets are examined by the threat signature detection module in step S45, the port scan detection module in step S50, the flood/DoS detection module in step S55, the permission detection module in step S60, and the SYN flood detection module in step S65.

The threat signature detection module in step S45 provides signature detection analysis to packet headers and data by comparing the packet information against several known threat signatures found in a comprehensive, Snort-compatible threat database. The threat signature detection module inspects header information across multiple network layers, including TCP, UDP, ER, ICMP, and others to detect protocol threat signatures. At the application level, threat signature detection module looks for signatures in any application protocol including HTTP, SMTP, FIP, DNS, and others. In at least one embodiment of the invention, Table 1 below details a number of protocols that are covered in the threat database:

TABLE 1

| Protocol | Default Ports | Applications |
| --- | --- | --- |
| echo/chargen | 7/19 | N/A |
| FTP | 21 | serv-u, wu-ftpd |
| Ssh1 | 22 | Openssh |
| telnet | 23 | solaris, sgi, bsd |
| smtp | 25 | mailmax, sendmail |
| dns | 53 | Named, bind |
| tftp | 69 | N/A |
| gopher | 70 | N/A |
| finger | 79 | N/A |
| oracle | 80 | N/A |
| www | 80, 8080, 8081 | iis, apache |
| pop2 | 109 | N/A |
| pop3 | 110 | N/A |
| portmap | 111 | N/A |
| nntp | 119 | N/A |
| Netbios, samba, mssql | 139 | N/A |
| imap | 143 | N/A |
| snmp | 161 | N/A |
| rlogin | 513 | N/A |
| Rsh | 514 | N/A |
| Lpr | 515 | N/A |
| ntalk | 518 | N/A |
| mountd | 635 | N/A |
| kadmin | 749, 751 | N/A |
| timbuktu | 1417 | N/A |
| upnp | 1900 | N/A |
| mdbms | 2224 | N/A |
| nlps | 2224 | solaris nlps |
| mysql | 3306 | N/A |
| cachefs | 32772:34000 | N/A |
| pdns | 4242 | N/A |
| rwhois | 4321 | N/A |
| pcanywhere | 5631, 5632 | N/A |
| X11 | 6000, 6010 | N/A |
| calserver | 6373 | N/A |
| Irc | 6666:7000 | N/A |
| Xfs | 7100 | N/A |
| proxy | 8080 | delegator |
| vqserver | 9090 | N/A |
| xtramail | 32000 | N/A |

The threat signature detection module in step S45 provides a library of rules which evaluate every packet, looking for a variety of signatures for threats including but not limited to viruses, worms, reconnaissance activity, backdoor usage, and buffer overflows. The library of rules can be updated as new attack signatures are identified. Threat signatures that are relevant only to one specific network can be added to provide customized monitoring of that specific network. The rule set in the library can be updated at any time with zero network downtime. In one embodiment of the invention, a custom rule can be created to block access to a particular web application except from the IP addresses of a limited number of authorized users. Access to the application is based on packet content, which is specified in the custom rule.

The threat signature detection module in step S45 can trigger varying response capabilities which are configurable on a rule-by-rule basis. Each rule can be set to either warn, filter the malicious packets, or block the traffic by disabling a switch port.

Threat signatures used by the threat signature detection module may utilize a generic form. For example, each signature may include:

a) A set of actions to take upon a match of the signature. Actions include, but are not limited to, alert, filter and block actions. Alerts are rate-limited on a per-signature basis. Blocking is only done once per signature/per host. Filtering will be performed on any packet matching such a signature.

b) Source and destination ranges of IPs, and source and destination ranges of TCP/UDP ports if one of those protocols has been selected.

c) A rule number, which is used to report alerts to the user interface of the threat management system.

d) A list of options specifying tests to apply against the packet. In some embodiments, this list may be empty.

In one embodiment of the invention, threat signatures are organized into super-, sub-, and common sets to increase throughput and decrease demand on network resources. If a packet does not match a superset rule, the rules in the corresponding sub and common sets would not be checked.

The threat signature detection module in step S45 includes the capability to test most fields within the various headers (IP, ICMP, TCP, UDP) which are being analyzed. Furthermore, payload data may be analyzed using uricontent searching and/or content searching. Uricontent searching looks for a URL in http requests, and uses Knuth-Morris-Pratt pattern matching to examine the URL for its argument. Content searching allows matching against any portion of the payload, using the Boyer-Moore pattern matching algorithm. Content searching may be restricted by the depth and offset keywords, specifying where in the payload to search. In addition, the nocase keyword may be used to perform a case-insensitive search. Case-insensitive searches may be performed only after case-sensitive ones, so that the packet data need only be altered once.

When the threat signature detection module in step S45 matches a threat signature, the specified action will immediately be taken. Additionally, the remaining signatures will continue to be analyzed. This is done to defeat an attacker from inserting a less malicious signature into a packet containing a highly malicious one, hoping to avoid the latter being picked up.

Variables may be defined in the rule file, and used in subsequent rules. A variable is defined using the syntax: var variable name=substitution text. Any occurrence of the token $(variable name) will be wholly substituted with substitution text. Use of the $(variable name) format with an undeclared variable name will result in an error.

An example of the use of a variable in a rule follows:
  var LOCALNET=[10.0.0.0/8,192.168.0.0/16,172.16.0.0/12]
  deny IP any any->$(LOCALNET) any (broadcast_src; sid: 1;)

The rule header determines the scope of the threat signature, and the action to take if it is matched. The rule header begins the rule, and takes the form:
  action protocol source direction destination
  where:
  action is any one of: (1) Warn: If a packet matches this signature, send an alert to the threat management system; (2) Deny: If a packet matches this signature, send an alert to the threat management system and filter the packet if it was on a filtering interface; (3) Block: if a packet matches this signature, send an alert to the threat management system, filter the packet if it was on a filtering interface, and make an attempt to block the source MAC address at the switch if netctl module is loaded and configured. "Alert" and "warn" are synonymous in this context.

protocol is any one of: (1) ip: test against any IP packet; (2) tcp: test against any TCP packet; (3) udp: test against any UDP packet; (4) icmp: test against any ICMP packet. Note that the latter three all imply the IP protocol.

source and destination are of the form: addr ports, where addr is either a single CIDR-style IP network, multiple networks enclosed in brackets and delimited by commas, or the keyword "any". Ranges may be prefaced with a '!' character to indicate "not within". For example: 192.168.0.1/32 matches the single IP address 192.168.0.1,192.168.0.0/24 matches all IP addresses from 192.168.0.0 through 192.168.0.255, and ![10.0.0.0/8,192.168.0.0/16,172.16.0.0/12] matches all IP addresses except those in the ranges 10.0.0.0 through 10.255.255.255, 172.16.0.0 through 172.31.255.255, and 192.168.0.0 through 192.168.255.255.

ports is either a comma-delimited range of ports or the keyword "any". If the rule is not a TCP or UDP rule, the ports field must be any. Ranges are indicated with either a ':' or '-' character. Ranges of the form :port indicate all ports from 0 up to port, inclusive, while port: indicates all ports from port to 65535, inclusive, and direction is one of '->', meaning only match traffic going from source to dest, or '<% gt', meaning match traffic going in either direction.

The rule body generally follows the rule header, and completes the rule. It is generally enclosed in parentheses and takes the form: (commands), where commands is a semicolon-delimited list of one or more of the following commands (commands are separated from their argument(s) via a colon). The commands may include, for example: (1) msg: Takes as its argument a quote-enclosed comment. This comment will be reproduced in a dataeval_dumprule, unlike comments beginning with '#'; (2) sid: Takes as its argument a single unsigned integer. This number will be reported to the threat management system in alerts if the signature is matched. Only one sid command is allowed per rule, and only one occurrence of each sid is allowed per ruleset; (3) broadcast_src: Match the source MAC address against the broadcast MAC address, FF:FF:FF:FF:FF:FF. This command takes no arguments; (4) broadcast_dest: Match the destination MAC address against the broadcast MAC address, FF:FF:FF:FF:FF:FF. This command takes no arguments; (5) sameip: Match the packet if the source IP address is equal to the destination IP address; (6) dsize: Match against the IP payload size. Takes as its argument a single integer between 0 and 65535, optionally proceeded by a '<' (anything less than or equal to) or '>' (anything greater than or equal to). The size does not include the IP header, but does include any transport-layer header; (7) ttl: Match against the IP TTL (time-to-live) field. Takes as its argument a single integer between 0 and 255, optionally proceeded by a '<' (anything less than or equal to) or '>' (anything greater than or equal to). The size does not include the IP header, but does include any transport-layer header; (8) ip-proto: Match against the IP protocol field. Takes as its argument a single integer between 0 and 255. Only allowed in IP rules (TCP, UDP, and ICMP imply certain IP protocols); (9) tos: Match against the IP ToS (type of service) field. Takes as its argument a single integer between 0 and 15; (10) id: Match against the IP ID field. Takes as its argument a single integer between 0 and 65535; (11) fragbits: Match against the IP fragmentation bits. Takes as its argument a list of one, two or three selections from: 'R': reserved bit, 'D': don't fragment bit, 'M': more fragments bit, followed by an optional selection of '+' (match all bits specified, others are allowed), '*' (match any one of the bits specified, others are allowed) or '!' (ensure none of these bits are set, others may be) (no specification implies match only of the exact bits specified are set); (12) fragoffset: Match against the IP fragmentation offset field. Takes as its argument a single integer between 0 and 65535, optionally proceeded by a '<' (anything less than or equal to) or '>' (anything greater than or equal to). Note that the actual fragment offset shall be multiplied by 8 previous to matching; (13) minfrag: Match against the IP fragment length. Operates in the same manner as dsize, except includes the IP header. Only matches fragments; (14) flags: Match against TCP flags. This command is only allowed in TCP signatures. Takes as its argument a list of one or more selections from: 'F': FIN bit, 'S': SYN bit, 'R': RST bit, 'P': PSH bit, 'A': ACK bit, 'U': URG bit, '1': CWR bit, '2': ECE bit, or '0', meaning no flag bits, followed by an optional selection of '+' (match all bits specified, others are allowed), '*' (match any one of the bits specified, others are allowed) or '!' (ensure none of these bits are set, others may be) (no specification implies match only of the exact bits specified are set). The special '0' operator may not employ such modifiers; (15) seq: Match against the TCP sequence number. Takes as its argument a single 32-bit integer. Only allowed in TCP rules; (16) ack: Match against the TCP acknowledgement. Takes as its argument a single 32-bit integer. Only allowed in TCP rules; (17) itype: Match against the ICMP type. Takes as its argument a single integer between 0 and 255. Only allowed in ICMP rules; (18) icode: Match against the ICMP code. Takes as its argument a single integer between 0 and 255. Only allowed in ICMP rules; (19) icmp_id: Match against the ICMP ECHO or ECHO_REPLY (ping) id. Takes as its argument a single integer between 0 and 65535. Only allowed in ICMP rules; (20) icmp_seq: Match against the ICMP ECHO or ECHO_REPLY (ping) sequence number. Takes as its argument a single integer between 0 and 65535. Only allowed in ICMP rules; (21) uricontent: May be used several times within a signature. Takes as its argument a concatenated series of either ASCII text enclosed by quotation marks or hexadecimal ASCII codes enclosed by pipes ('|') (ie "A" and |41| match the same text), optionally proceeded by a '!'. If all other commands match a packet, each uricontent argument shall be searched for in an HTTP URI request. The use of the '!' modifier indicates that the uricontent rule should only match if this content is not present. Note that this command is quite computationally expensive relative to other tests. Only allowed in TCP rules; (22) content: May be used several times within a signature. Takes as its argument a concatenated series of either ASCII text enclosed by quotation marks or hexadecimal ASCII codes enclosed by pipes ('|') (ie "A" and |41| match the same text), optionally proceeded by a '!'. If all other commands match a packet, each content argument shall be searched for in the packet payload (relative to the rule protocol. IP rules begin searching after the IP header, UDP after the UDP header, etc). The use of the '!' modifier indicates that the content rule should only match if this content is not present. Note that this command is quite computationally expensive relative to other tests. The content commands can be modified by several other commands. Each of these commands apply to the closest previous content command in the rule; (23) offset: Takes as its argument a single integer between 0 and 65535. Content matching will begin this many bytes into the payload; (24) depth: Takes as its argument a single integer between 0 and 65535. Content matching will occur only up to this many bytes from the payload start; (25) nocase: Takes no arguments. All content rules will be considered case-insensitive; that is, content: "A", will match both "A" and 'a' in the packet payload.

It should be appreciated that changes and updates to the threat detection system may be accomplished "hot" in real-time, without needing to reboot the system. All of the threat analysis modules may be loaded or disabled dynamically. New modules can be added with no displacement of hardware or interruption of operation. This includes new threat signatures continually added to the on-board library.

The port scan detection module in step S50 detects port scans using a trending cache. Some scans are easily detectable, such as attempted communications with rarely used ports. Common scans like NMAP and commercial probes are also easily identified. If an unauthorized internal user tries to conduct a scan, the port scan detection module will also detect and prevent this attempt to access resources. Since scanning packets can be dropped or ports closed, the party attempting to perform the scan receives no response, and thus no useful information about the systems being scanned.

The scans that the port scan detection module can detect include, but are not limited to:

TCP connect scan (nmap -sT): For all ports in the provided range, establish a TCP connection (syn, syn-ack, ack three-way handshake). TCP will return an rst on syn's to closed ports, and will otherwise return an ack.

SYN scan (nmap -sS, the default): For all ports in the provided range, establish a TCP half-open (syn, syn-ack, no acknowledgment). The only difference between TCP connect scan and SYN scan is the lack of the final ack, which can foil some ids's.

FIN scan (nmap -sF): For all ports in the provided range, send a packet disconnected from any session with only the FIN flag raised. An rst should be returned from closed ports. Open ports should return nothing to such a malformed packet.

Xmas scan (nmap -sX): the urg and psh flags are raised in addition to the FIN. Everything else is the same as a FIN scan.

Null scan (nmap -sN): all rules of the FIN scan apply, but no flags are raised.

Ack scan (nmap -sA): only the ack flag is set, in an attempt to bypass firewall rules by appearing to be part of a session.

UDP scan (nmap -sU): a UDP packet is sent to selected ports on a host. Closed ports should return an ICMP destination unreachable (port unreachable) message, while open ports should either reply with other traffic, or send nothing. Most UNIX-derived systems rate-limit the port unreachable messages.

The port scan detection module stores two objects within each iphost: a score for each type of scan detectable, and a list of the most commonly accessed ports on that IP. In one embodiment, the score is reset each minute. In other embodiments, a linear regression may be implemented to slowly reduce the impact of earlier accesses. The list of most active ports is modified on the destination host each time a new session is created. If the port is on the list, its score is weighted up by the following method. If the port is not on the list, it replaces the entry with the lowest score, and adds to the corresponding scan scores of the source and destination hosts. When the score for a destination exceeds a constant, an alert is generated. In one embodiment of the invention, this constant is user-selectable. In another embodiment, the number of commonly used ports is user-selectable. Another constant is applied to the source. If its score is above this constant, the scan is judged to be single-sourced. Otherwise, it is judged to be distributed.

The port scan detection module may be used in two different ways: as a stand-alone module, or as a plug-in to the permission detection module. Assuming an accurate set of permissions in the permission detection module, the latter can be much more accurate, as traffic explicitly accepted by permission detection module will not be fed into the port scan detection module.

The flood/DoS detection module in step S55 employs both volume threshold and anomalous traffic pattern analysis to detect a variety of flood and denial of service ("DoS") attacks. The flood/DoS detection module identifies malicious packets of a flood attack from a single or multiple IP addresses and filters them while allowing normal traffic and existing sessions to continue to flow normally. In certain instances, attempted flood attacks that only impact a small percentage of available bandwidth can be ignored, as they fail to affect normal/legitimate traffic flow. Larger floods attacks are addressed by filtering enough of the flood packets to allow normal network operation.

The flood/DoS detection module is also capable of preventing internally generated flood contagions, such as Code Red, which compromise web servers and seeks to broadcast the infection from the web server's port 80. Upon detecting outbound traffic from an infected web server, the flood/DoS detection module filters the traffic out, thus containing the contagion.

The flood/DoS detection module operates by measuring traffic, then comparing results against expected levels. The expected levels are set as a default value which can be modified on a per-host basis as needed. A DoS attack is defined here as traffic which does not fit expected characteristics, and at the same time causes degradation to a part of the network's reliability or bandwidth. In one embodiment, the flood/DoS detection module partially relies on user tuning of IP's to detect flood/DoS attacks. In other embodiments, the flood/DoS detection module includes self-tuning capability. For each protocol the module analyzes, the module may be tuned by an operator by moving a given IP's triggering levels along discrete points of an curve. The curve increases logarithmically up to the default value, then increases exponentially. Measuring of traffic is done in a per-second increment. If the current amount of traffic is below the average (expected) amount of traffic on the interface, no actions will be taken. The triggering level is lower than normal if a continuous DoS attack has already been noted, so that more traffic will be filtered. The decision to take an action is based on per-protocol tuning, defaults, and weighing.

Determining whether a certain packet is part of a DoS attack involves weighting the packet. This is done to take advantage of knowledge about standard flooding techniques, and to protect from the reverse denial-of-service attack whereby an attacker elicits flood-like traffic from an innocuous host, causing it to be regarded as hostile itself. TCP packets are given a default weight of one if they start any kind of new session cache entry, unless they are an rst packet (which is given a weight of three). Moving along the route to an established session adds no points (any reply from the original destination), and causes the session to no longer run the chance of filtering by the flood/DoS detection module. An rst sent in reply will weigh the packet up to three. UDP packets are given a default weight of one. This is added for each packet in the session until a UDP reply is seen, at which point the session no longer runs the chance of filtering by the module. An ICMP port unreachable message will weigh the packet up to three. All ICMP packets will have a chance to be filtered, due to the automatic nature of their replies. A new ping request is weighted to one. All other ICMP messages starting a session are weighted to two, unless they are an unexpected timestamp reply, unexpected info reply, unexpected address reply, or unknown ICMP type. All fragments are given a weight of one if they result in a new datagram allocation. New fragments in the datagram will not be given a weight, unless they duplicate or overwrite an existing fragment, in which case they are weighted to two.

At the end of the weighting process, the weight is added to the original source's source score, and the destination's destination score. When a DoS attack is diagnosed, any protocols which have seen more than their expected share of traffic may alert. If it is clear that only a very few sources are responsible for a majority of the offending traffic, an alert will immediately be issued regarding these "single-source" DoS's. If the traffic is spread out among many hosts, a "distributed source" DoS alert will be made provided the crossing of yet another threshold of traffic. If either is originating from the inside, the flood/DoS detection module can attempt to block the hardware addresses involved automatically, provided a managed, security-enabled switch is in use. The use of such a switch is strongly recommended. The MAC addresses can not be spoofed on a manageable switch.

The permission detection module in step S60 module provides granular network access control based on user and host permissions. This allows security administrators to control access to their networks' resources in a variety of ways: by host computer or logical group of hosts, user or logical group of users, port, IP range, or protocol. Here a host is designated by either its MAC address or its IP address, a host group is a collection of hosts and host groups, and a user group is a collection of users and user groups. Users may be declared, having their own permissions. When a designated user logs on to host computer, a GINA client (for Windows) or a PAM module (for UNIX) on the host associates that user with that host. While the user remains logged on the permission detection module associates the user's permissions with that host and any other hosts accessed from it.

The permission detection module provides centralized strong authentication of users and considers users' permissions during analysis of network traffic. Access permissions are comprised of two major portions: a set of criteria (or constraints) used for matching against network data, and a set of policies or actions to take if the expressed criteria are met.

The following criteria are recognized: Source/Destination User or User Group: defined by name and password; Source/Destination Host or Host Group: name and MAC address or IP address; Protocol: TCP, UDP, ICMP, IGMP, and ARP; and Port: Source or destination port numbers.

The corresponding policy actions are: Accept: explicitly allow connections of this type; Alert: send a warning to the threat management system; Deny: filter out any packets in the session, if possible; or Block: block the offending source traffic at a switch or firewall, if possible.

Upon receipt of a packet, the permission detection module first examines the session cache to determine whether the packet is part of an already-analyzed session. A TCP session may be defined as the collection of packets having the same TCP/IP endpoints (IP source and destination addresses together with TCP source and destination ports), ending with a full network close (acknowledged FIN packets sent from each side), internal timeout, or abort (single RST packet). For UDP, the collection of packets having the same UDP/IP endpoints, ending either with a timeout or an ICMP "port unreachable" message. The permission detection module enforces the security model by filtering unauthorized packets from the network or by blocking switch ports from which disallowed traffic originates.

For a packet to match a permission, it must match at least one of the constraint values supplied for each provided class. Adding criteria classes leads to a "tightening" of the specification, resulting in fewer matched packets, while adding more choices to an already-supplied class "loosens" the rule. This may be illustrated in the following example.

TABLE 2

| User | User Group | Host | Host Group |
|---|---|---|---|
| Stella | All (Stella, Freya, Ariadne) | Eris | Dev (Eris, Chao) |
| Freya | | Malaclypse | All (Dev, Malaclypse) |
| Ariadne | | Chao | |

The permission constrained by the instruction hostsrc=dev userdest=ariadne ipproto=tcp will allow any TCP traffic from either Eris or Chao to wherever user Ariadne is logged in (nowhere if she isn't logged in), while the instruction hostsrc=dev userdest=ariadne,freya ipproto=tcp allows the same, but to either Ariadne or Freya. Similarly, the instruction hostsrc=dev usersrc=all userdest=ariadne,freya also allows UDP, though all traffic must have a user logged into the source machine to now be considered valid.

The permissions table is searched in the order provided, and the first rule matching the traffic is the only one used. If no rules are matched, a default action set is applied. It is strongly recommended that the default action be to deny traffic and that carefully-crafted accept rules explicitly allow planned traffic. This provides the most secure setup of the permission detection module.

Once a packet is analyzed, an entry is made for it and related packets also affect this cache entry (i.e., if the default action is to accept, then is switched to deny and all sessions that were being implicitly allowed will begin to be filtered). Furthermore, whenever a permission is added, deleted or altered so that the status of a cached session might change, all sessions cache entries will be invalidated and reevaluated.

In addition, there exists the concept of metahosts; these are special entities corresponding to no particular host. For example, in one embodiment of the invention there may be two metahosts: unmatched_host and unknown_multicast. These hosts may be employed in permissions like a regular host group.

As mentioned above, the permission detection module can optionally associate a user with a physical host. This allows the system administrator to restrict the access privileges of the specified user-host combination within the network. In one embodiment of the invention, the feature operates as follows: (1) A Windows GINA client or a UNIX PAM module is installed on workstation hosts from which users will access the network. This client/module software interfaces with the relevant standard logon procedure; (2) When a user successfully logs on from that host, the GINA/PAM software transmits the user's user ID, encrypted with the logon password, to the intrusion detection system. This is done via an encrypted SSL tunnel, authenticated using industry-standard X.509 certificates, signed by the intrusion detection system root; (3) The intrusion detection system ensures the security of this interchange by validating that all certificates used in the interchange are issued by itself as the root authority and that the X.509 common name (CN) matches the sending host's address; (4) From that point on, the intrusion detection system associates all permissions for that user ID with (a) the physical address of the workstation host from which the user logged on and (b) any other hosts accessed from the sending MAC and IP addresses. In another embodiment of the invention, the client software will be installed on the authentication server, eliminating the need for software on individual workstations.

The SYN flood detection module in step S65 provides anomaly-based SYN flood DoS detection. SYN attacks are particularly devastating even at low levels since each SYN packet received by a host requires resource allocation. In one embodiment, a SYN proxy mechanism is included to further improve SYN flood protection. SYN floods have certain integral differences which separate them from other floods. They are effective not due to consuming resources available to any network traffic (cpu load due to IRQ processing, sum bandwidth), but by exhausting a pool exclusively available to the initiation of TCP connections. As a result, far fewer SYN packets are required in order to constitute a full flood. Furthermore, a very small and rigid state machine must be employed in order to successfully implement a SYN based DoS attack.

The SYN proxy mechanism draws on these two facts to provide a precise defense against DoS attacks employing SYN packets. A real TCP connection must not spoof its source address. The reply to an initial SYN would fall into the ether, and eventually time out. A DoS, on the other hand, doesn't care about continuing the session, the only goal is to occupy one of the berths allocated for half-open TCP transactions. As a result, the SYNs employed in a DoS will often provide a false address, to deflect return bandwidth and attention away from the true source(s). Modifying the detection heuristics to take note of uncompleted sessions will provide a much more precise algorithm. Each incoming SYN will, instead of being passed on immediately to the less capable defended boxes like most packets, have a reply SYN-ACK generated on and issued from the defending intrusion detection system. This both prevents the smaller resource pools behind the intrusion detection system from being overwhelmed and assures the intrusion detection system a complete and accurate view of SYN-ACK confirmations or lack thereof. A completed and confirmed TCP connection can be filtered through existing algorithms, then passed on to defended machines.

Based on the analysis performed by the threat analysis modules in steps S45, S50, S55, S60 and S65, the system takes one or more actions for each network packet examined in step S70. These actions may include accepting the packet in step S72, sending an alert to the network management system in step S74, rejecting the packet and filtering it out of the traffic stream in step S76, or rejecting the packet and blocking the port through which the offending packet traveled in step S78. Other actions may include filtering out a series of packets, filtering port scan activity so that no reconnaissance information is returned, throttling floods by filtering packets attributed to a DoS/DDoS, disabling the port on the switch from which an attack originated. In at least one embodiment of the invention, a security administrator may be alerted before any automated action is taken. After an action is taken based on the verdict of the threat analysis modules and/or protocol anomaly detection module, the non-offending network packets may be forwarded along to their destination in the network and the process ends in step S80.

It should be appreciated that the threat detection system may further utilize a behavior model evaluation module in its threat analysis. This module examines a packet stream for anomalous conditions based on a behavior model created from observed averages over time. The behavior model evaluation module analyzes a selection of the packets seen, building short-term averages over various fields. These snapshots of usage patterns are put together to form a standard behavior model for the network consisting of mappings from usage (user logged in or not, amount of traffic related to ftp, etc.) to opportunities for that usage (hours, total traffic). Once a stable pattern has emerged, the behavior model evaluation module moves from its learning to its active mode, allowing slight modifications to its model, but marking sharp aberrations as potential threats. If network behavior consistently falls outside of the model, the model evaluation module will reenter its learning mode, and stop alerting.

In at least one embodiment of a behavior model evaluation module, the module takes as its input 0 to n analysis descriptions, expressed in terms exported by the module, and joined by an assumed ratio for the given context, such as "per" or "percentage of", for example. These measures form the basis of the model described above. Any number of analyses may be run, but that number is inversely proportional to the number of packets which will be selected for analysis. The syntax language will be based on threat signature detection module testing, so that code detecting various network events and its results can be shared. The behavior model evaluation module utilizes linear regression models, developing as its base of behavior a collection of linear regression channel lines. The channel lines are not formalized until a basic stasis has been met. Stasis is defined as the average of the absolute value of the second derivative of a function mapping the recent measures of network activity against the absolute difference between the sum of measurements there, and the average of the previous measurements.

The threat detection system may utilize a variety of techniques for analyzing network traffic. In at least one embodiment, the threat detection system may analyze network packets using a high-speed extension of Linux packet sockets, an interface for receiving raw network frames. The mmap extension of packet sockets allows the kernel to make packets available to the analysis modules in a shared memory buffer. When in mmap mode, a packet socket shares a memory buffer with the threat detection process that opened it. A configurable amount of each incoming packet is copied into this buffer for examination by the module. The threat detection system kernel uses an extension to mmapped packet sockets to allow threat detection system to return a verdict on each incoming packet, indicating whether it should be forwarded or dropped. This is implemented by an extension to the shared kernel/user mmap buffer. The buffer contains a fixed number of slots, each able to hold one packet. In filtering mode, each of these slots also carries a pointer to the actual packet it contains, and an indication of whether it is still being examined by the module. While a packet is attached to the buffer, it is suspended from further network processing pending a verdict. Once the module has examined the packet and returned a verdict to the kernel, the packet is either immediately discarded, or re-injected into the network stack exactly where it was removed to continue being processed as normal.

In another embodiment of the invention, the module may specify a number of locations in the packet to be modified before the packet is re-injected. This permits nat-type operations to be performed on packets passing through the system, such as enabling threat detection system to carry out the initial portion of a TCP handshake on behalf of hosts it is protecting.

Figure 2:
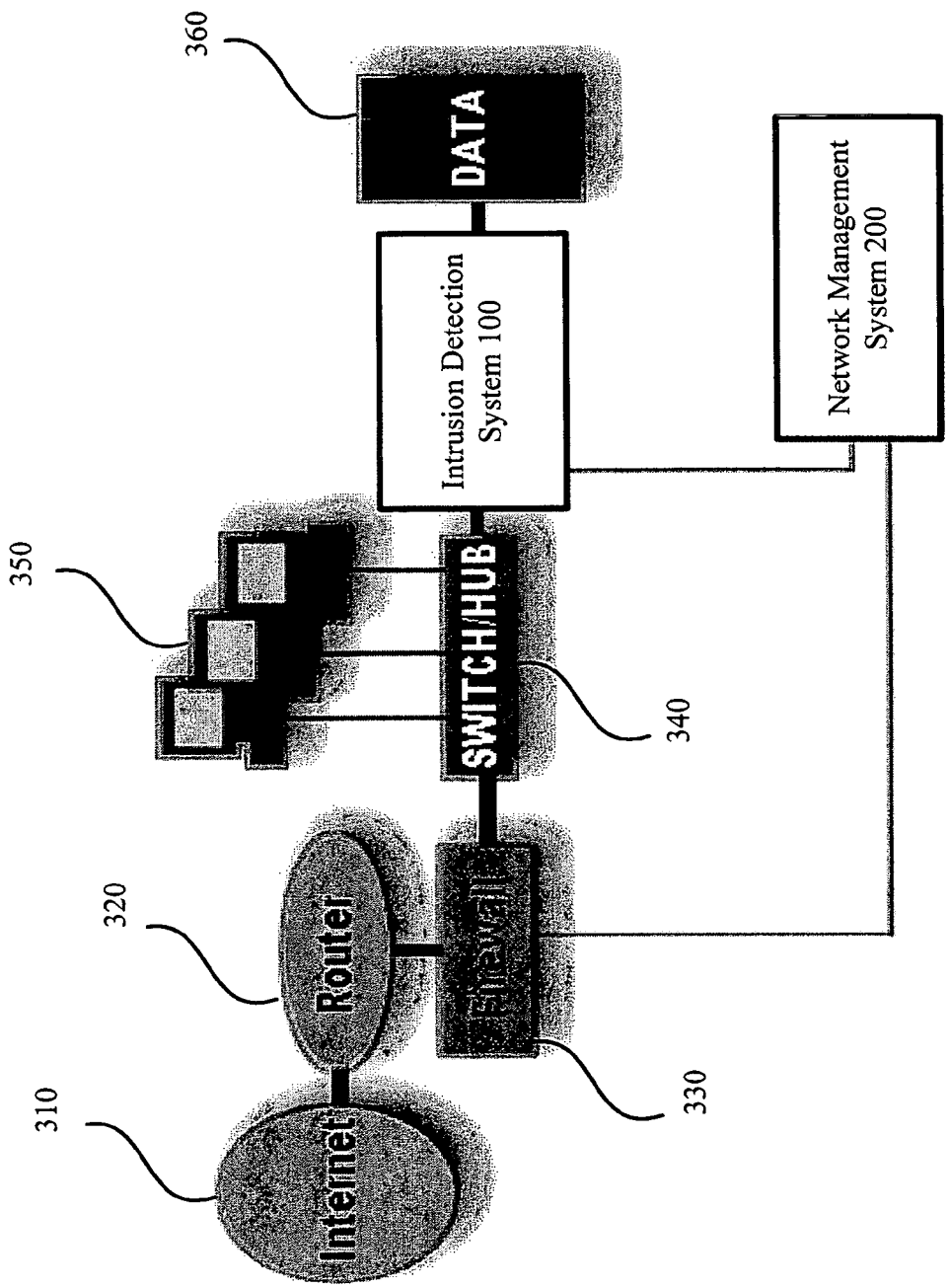
FIG. 2 is an illustrative network including a threat detection system and network management system in accordance with one embodiment of the invention.

The above-described methods for detecting and responding to network intrusions can be used in a variety of networked environments to address the threats posed by network attacks. As shown in FIG. 2, an illustrative network including a threat detection system 100 and threat management system 200 is disclosed. Network packets travel from the Internet 310 through router 320 until its hits the target network's firewall 330. Traffic that makes it past the firewall 330 will travel to the switch/hub 340, and then on to its destination either in workstations 350, or if data 360 is the target, to threat detection system 100. The threat detection system 100 has been deployed between switch/hub 340 and data 360 to provide threat detection and response capabilities before network data arrives at data 360. In this configuration, threat detection system 100 acts a bridge between the two nodes, completely transparent to the network, while at the same time in full control of all network traffic passing between the two nodes. Data 360 may represent internal data stores, networks or machines (i.e., hosts or subnets). As shown in FIG. 2, the "inline" configuration allows threat detection system 100 to filter offending traffic and discard those packets, send an alert to threat management system 200 of possible attacks on the network, disable a port on the switch/hub 340, or take other actions described above. The threat management system 200 provides the central point for administration of each threat detection system 100 in the network.

Figure 3:
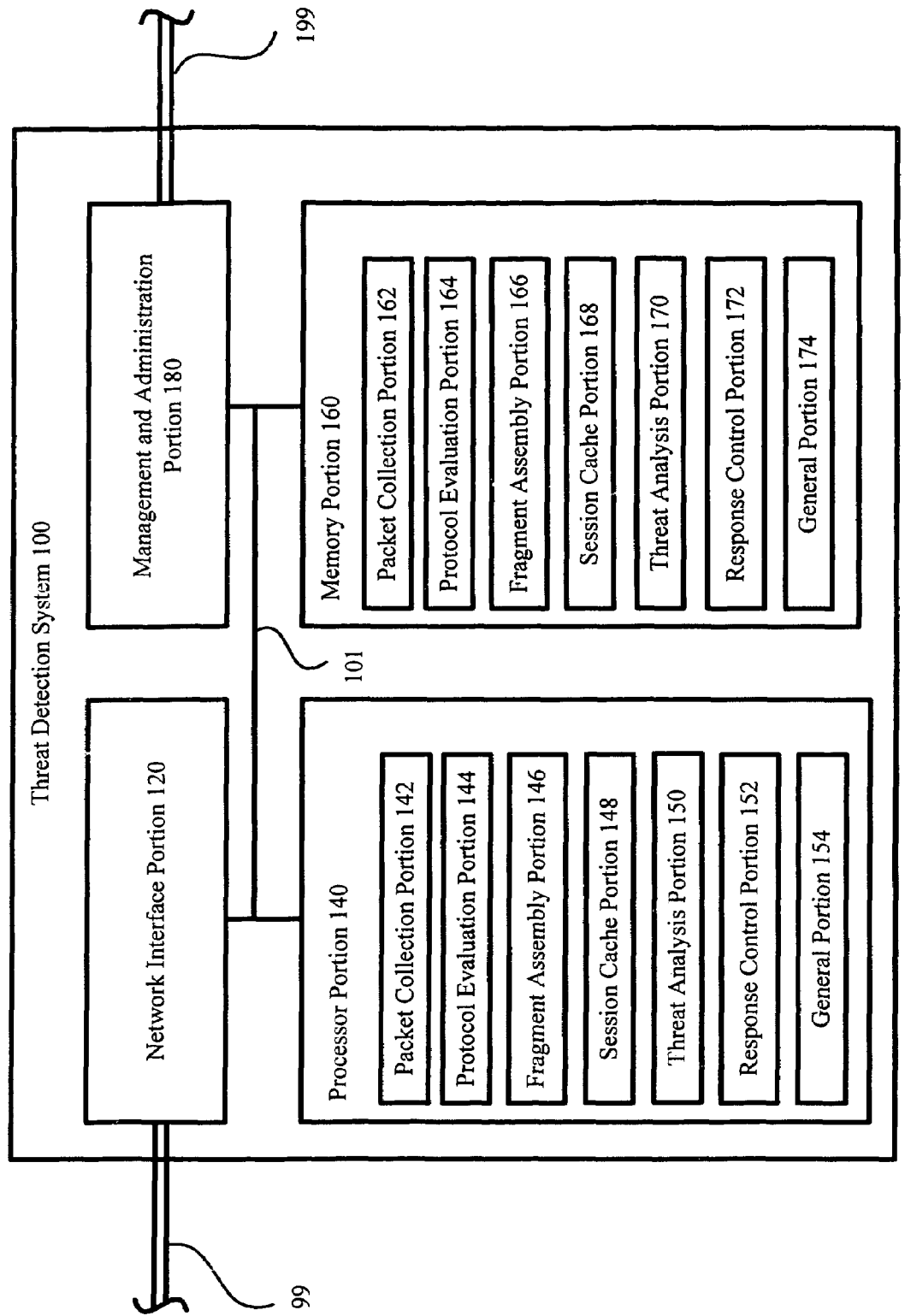
FIG. 3 is a schematic of the threat detection system of FIG. 2 in further detail in accordance with one embodiment of the invention.

FIG. 3 is a schematic of the threat detection system of FIG. 2 in further detail in accordance with one embodiment of the invention. Threat detection system 100 includes network interface portion 120, processor portion 140, memory portion 160, and management and administration portion 180. Each of these components are connected and in communication via a data bus 101. Network interface portion 120 receives data from and send output to the network traffic stream via connection 99. It should be appreciated that network interface portion 120 may operate in the data link layer 2 of the OSI model.

Processor portion 140 controls the flow of network traffic through the threat detection device 100. Processor portion 140 analyzes the data collected from the network, determines what action must be taken with respect to each network packet examined, and generates output to the threat management system 200. Threat detection system 100 further includes a memory portion 160. In operation, processor portion 140 retrieves data from and stores data for use by the threat detection system 100 in memory portion 160. Management and administration portion 180 communicates with threat management system 200 through communication link 199. Through management and administration portion 180, alerts and other data may be forwarded to the threat management system 200 for display to an administrator, and updates to the configuration of the threat detection may be delivered to threat detection system 100.

As shown in FIG. 3, processor portion may include several subportions used to complete the analysis of each network packet received, and generating the response for handling a network packet once it has been examined. Packet collection portion 142 directs the collection of network packets from the network and delivery for analysis of the same packets in the threat detection system 100. In at least one embodiment of the invention, packet collection portion 142 implements the collection as described in step S10 of FIG. 1 above. Protocol evaluation portion 144 implements the protocol anomaly detection module, described above with reference to step S15 of FIG. 1. Fragment assembly portion 146 coordinates the reassembly of IP fragments received by the system so that they may be examined by the threat analysis modules, as described above with reference to steps S30 and S35 of FIG. 1. Threat analysis portion 150 controls the delivery of each network packet to the session cache, as described above with reference to step S40 of FIG. 1, and the analysis of each network packet by each individual threat analysis modules in steps S45, S50, S55, S60 and S65, while session cache portion 148 controls the handling of each network packets in the session cache. Response control portion 152 determines the appropriate action for handling each network packet based on the threat analyses performed by the threat analysis portion 150. Response control portion 152 also implements the action required on each network packet, as described above with reference to step S70 (and actions taken in steps S72, S74, S76 and S78). General portion 154 controls all remaining processing not addressed by one of the portions described above.

Memory portion 160 includes several subportions that are used in the threat detection invention. Network packets collected from the network for analysis by the threat detection system 100 are first placed in the packet collection portion 162. Protocol evaluation portion 164 includes the protocol anomaly detection module and information used by the module for its analysis. Fragment assembly portion 166 is used in the reassembly of IP fragments before transfer to the session cache. Threat analysis portion 170 includes the threat analysis modules that are used to analyze the network packets stored in the session cache portion 168. Response control portion 172 includes the rules for determining the appropriate action for handling each network packet based on the threat analyses performed. General portion 174 may be utilized to store any other necessary data and information for the operation of the threat detection system 100. The various memory components contained in the memory portion 160 may take on a variety of architectures as is necessary or desired by the particular operating circumstances. Further, the various memory components of the memory portion 160 may exchange data or utilize other memory component data utilizing known techniques, such as relational database techniques.

Figure 4:
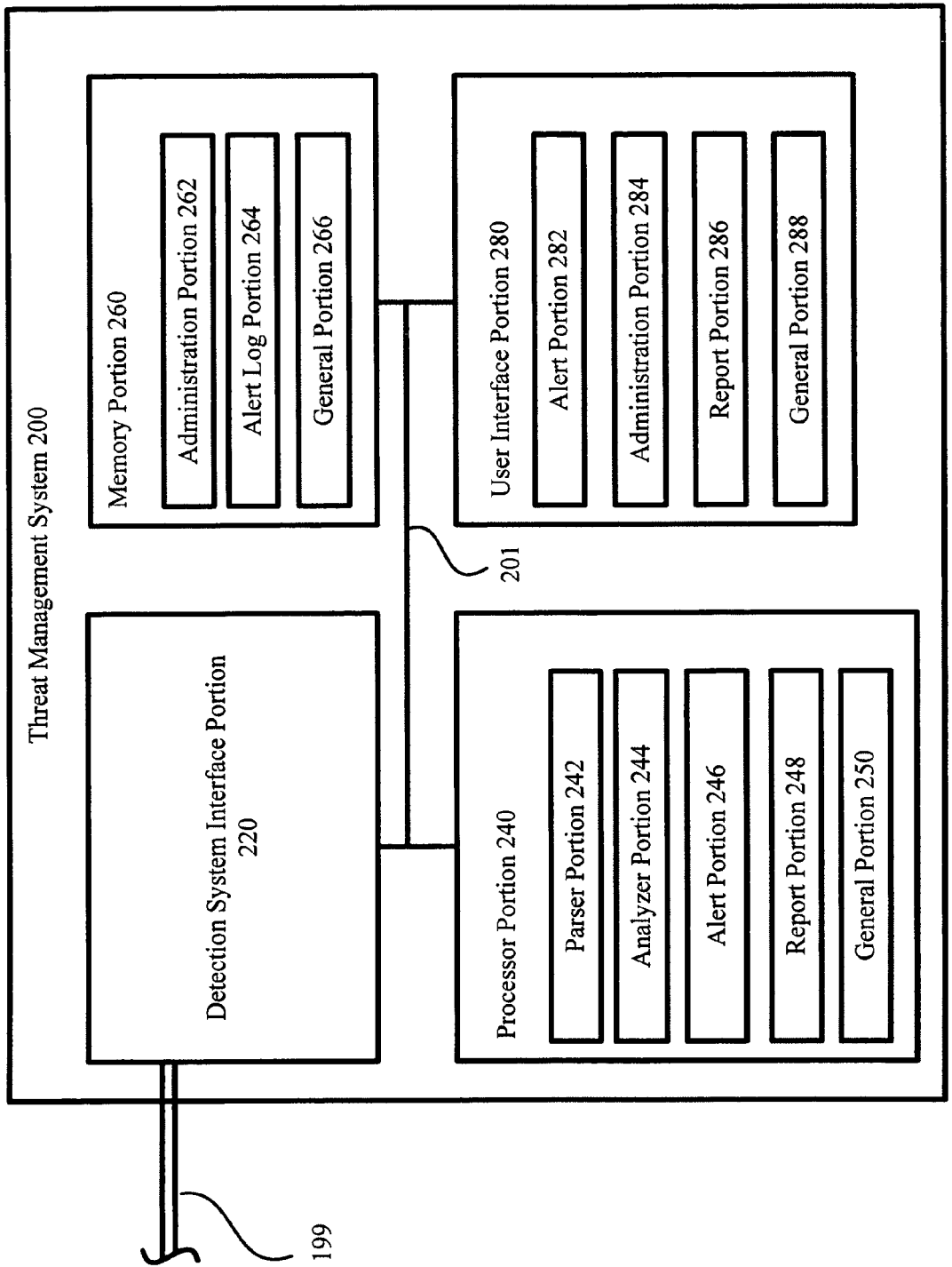
FIG. 4 is a schematic of the threat management system of FIG. 2 in further detail in accordance with one embodiment of the invention.

FIG. 4 is a schematic of the threat management system of FIG. 2 in further detail in accordance with one embodiment of the invention. Threat management system 200 includes detection system interface portion 220, processor portion 240, memory portion 260, and user interface portion 280. Each of these components are connected and in communication via a data bus 201.

Detection system interface portion 220 receives data from and send outputs to the various threat detection systems 100 controlled by threat management system 200 via connection 199. In at least one embodiment, each of these communications is SSL encrypted, and authenticated using X.509. Processor portion 240 includes parser portion 242, analyzer portion 244, alert portion 246, report portion 248 and general portion 250. Processor portion 240 collects and analyzes all alerts and messages from the network threat detection systems, and as well as controls the storage of historical information of alerts, responses and configuration in the memory portion 260. Memory portion 260 includes administrative portion 262, alert log portion 264, and general portion 266. User interface portion 280 includes alert portion 282, administration portion 284, report portion 286 and general portion 288. User interface portion 280 is responsible for displaying the attack information and administrative functionality to an administrator operating a client system.

Referring to processor portion 240 in further detail, parser portion 242 and analyzer portion 244 play a key role in the handling of alerts and data for the individual threat detection systems. In this embodiment, parser portion 242 includes a unique parser for each threat detection system. Each parser translates a data input stream, as sent by the threat detection system, into either Packet or Message objects. Packets are then passed to the parser's packet handler, while messages go to the parser's message handler.

Furthermore, after the parser receives and decodes a packet from its threat detection system, the packet is sent to a O(1) cache array. A cache hit indicates that the new packet is identical to one currently cached. In this embodiment, the count on the original packet is incremented by the count of the new packet, the new packet is freed, and the original packet remains in the cache. A cache miss moves the original packet into a outgoing queue and sets the new packet to the cache index. A thread also scans the cache and automatically moves cached packets older then a given maximum into the outgoing queue. The parser also includes a thread to periodically flush the outgoing queue by sending all packets in the queue to the packet handler. The packet handler set is implemented as a chain of handlers which eventually place the packets in the incoming queue for the analyzer portion 244.

In at least one embodiment of the invention, packets from multiple threat detection systems feed into a single analyzer in the analyzer portion 244 for aggregation into attacks. Each analyzer has an analysis thread for each threat detection system, and a main thread to propagate updated attacks via it's attack handler. The attack handler feeds into a RMI communication mechanism to propagate attack information to the report portion 248 of the threat management system 200. Each thread in the analyzer operates on packets for a specific threat detection system when aggregating attacks. For maximum performance, a poly-stage resolution strategy is employed. The first three stages leverage various O(1) lookups, attempting to resolve a current attack the packet belongs. The next two stages search the updated attack buffer (which contains attacks updated since the last transmission was sent to the threat management system) followed by a search of all known, ongoing attacks. If, after these five stages, no attack is found which the packet can belong, the packet is determined to be the first packet of a new attack, and the new attack record is created.

With the packet resolved to an attack, the second stage of analysis, attack aggregation, can occur. Attack aggregation is the merging of attacks with partially similar source/target information. This aggregation is currently implemented as a two-state aggregation system (fully aggregated or not aggregated), however, intermediate stages may be utilized. An attack that is aggregated (including aggregation types not implemented) may have an infinite number of streams, though the actual number maintained in memory may be bounded. A fully aggregated attack mandates that a single host be part of the stream. A non-aggregated attack mandates that both ends of its streams have identical host:port pairs. Aggregation levels not implemented would mandate amount of stream connection data be identical.

After the end of the second stage aggregation, regardless of whether the final attack is an aggregate attack or not, the attack is inserted into an "updated" queue (the same queue searched in the fourth attack resolution level) and the cycle repeats. From there, the analyzer's main thread periodically sends the collection of updated attacks to its attack handler, similar to how the parser fed attacks to its packet handler. The attack handler set externally, implemented as a chain, and terminates by collecting and transferring attacks to the threat management system. These layers of queuing allow for throttled updates to monitors, large performance gains from caching, and decreased co-transfer overhead due to single large transactions instead of multiple small transactions.

It should be appreciated that frequently accessed data structures, in the system, are either hashes (constant time performance), n-ary trees (logarithmic time performance) or some combination of the two. By combining the two several times over with different hashing or comparison algorithms, certain aggregation patterns and relationships are naturally exposed. Furthermore, worst-case behavior is not dramatically effected by the number of attacks.

In addition, it should be appreciated that the transfer of information (packets, attacks, messages, etc) within the threat management system is handled via different "Chains": PacketChain, AttackChain, MessageChain, SolutionChain, and CommandChain. Each chain is comprised of "links", each of which is a "Handler" for the appropriate Chain type (e.g., PacketChain/PacketHandler, AttackChain/AttackHandler). The chains are constructed and modified when a component is first initialized, however the capability to dynamically add and remove 'links' (i.e., dynamically add and remove behavior or functionality) currently exists. Communication within the threat management system may be handled by two different interface mechanisms: Java RMI over SSL, and a custom method invocation mechanism over SSL. Though implementations and programmatic interfaces differ, both leverage a generic compression object to conditionally cause data to be GZIP compressed before transferring across the network.

In one embodiment, the Packet Chain connects the parsers with the analyzers. In the middle of the Packet Chain, before the analyzer receives the packets, a andler link exists to save the packets to the database. This uses the PacketSaver interface and FallbackSaver mechanism. The Attack Chain allows update attacks to be propagated from analyzers to the threat management system. The Message Chain collects messages from threat detection systems as well as generated error messages and propagates the messages to the system. The Command Chain is used to process Commands as received by the system. Valid Commands range from explicitly removing certain attacks to returning status information. If return information is necessary, a message is returned along the Message Chain.

Figure 10:
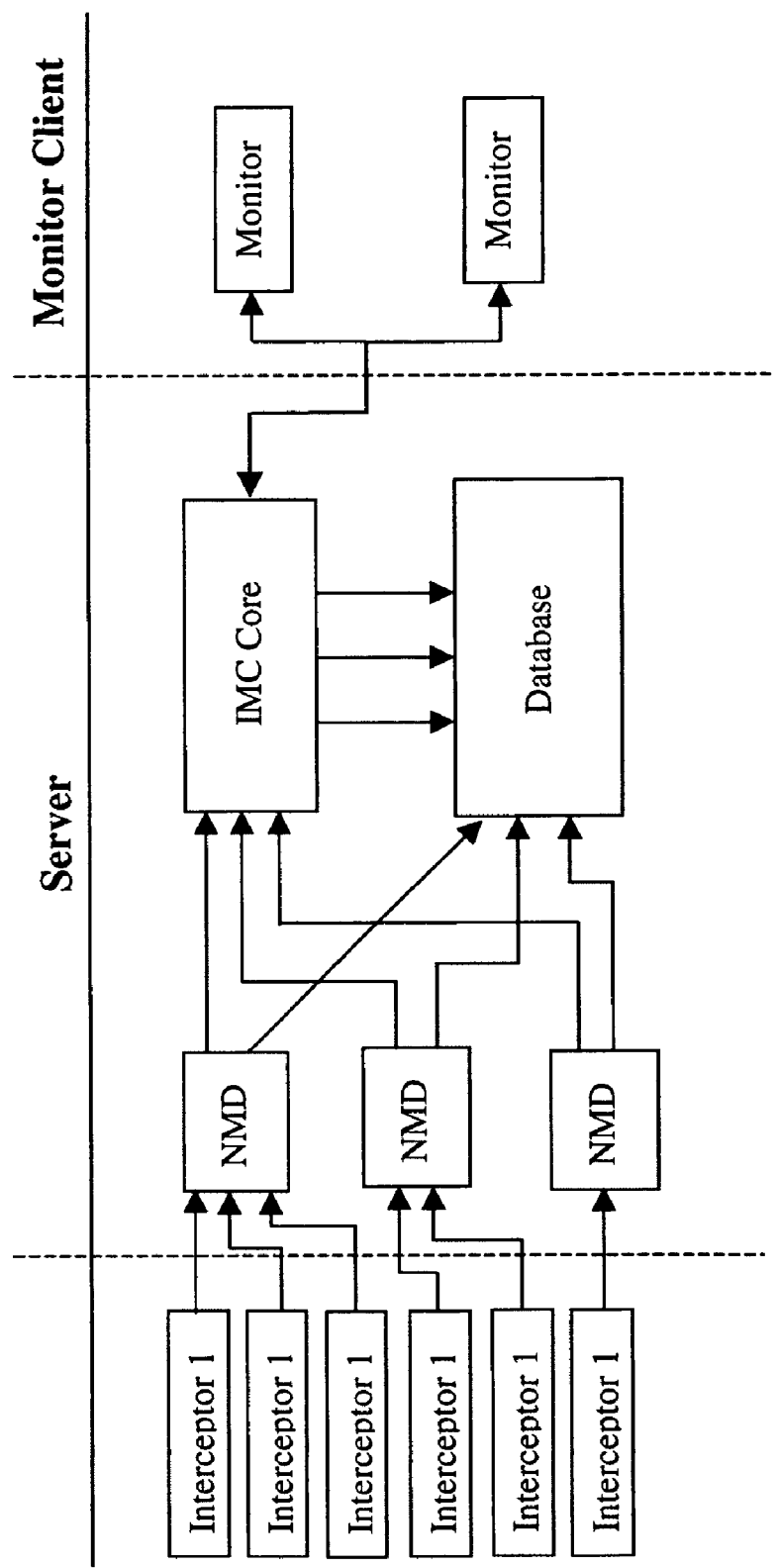
FIG. 10 is an illustrative network including an threat detection system and threat management system in accordance with one embodiment of the invention.

It should further be appreciated that various components of the threat management system may be organized in a manner that facilitates coordination of alerts from the individual threat detection systems. For example, as shown in FIG. 10, which is an illustrative flow schematic showing the movement of packets between threat detection system (referred to as Interceptors in FIG. 10), and the components of the threat management system (referred to as Server in FIG. 10), and the user interface (referred to as Monitor Client in FIG. 10) used by administrators to review alerts and make administrative changes to the system configurations. As shown in FIG. 10, the threat management system may includes a plurality of Network Manager Daemon (or NMDs) that perform the processing of the parser and analyzer portions in this embodiment, saving, analyzing, aggregating packets from each threat detection system, and propagating information to processing routines of the IMC Core. Furthermore, the NMDs invoke database packet saving routine, in conjunction with a portion of the system's memory portion (represented at least in part by the database in FIG. 10). The IMC Core of FIG. 10 performs the remaining processing in the functionality of the threat management system, as described herein. In this embodiment, the threat detections systems, threat management system and user interface portion are used by an administrator to monitor for and respond to attacks on a networked environment.

Figure 5:
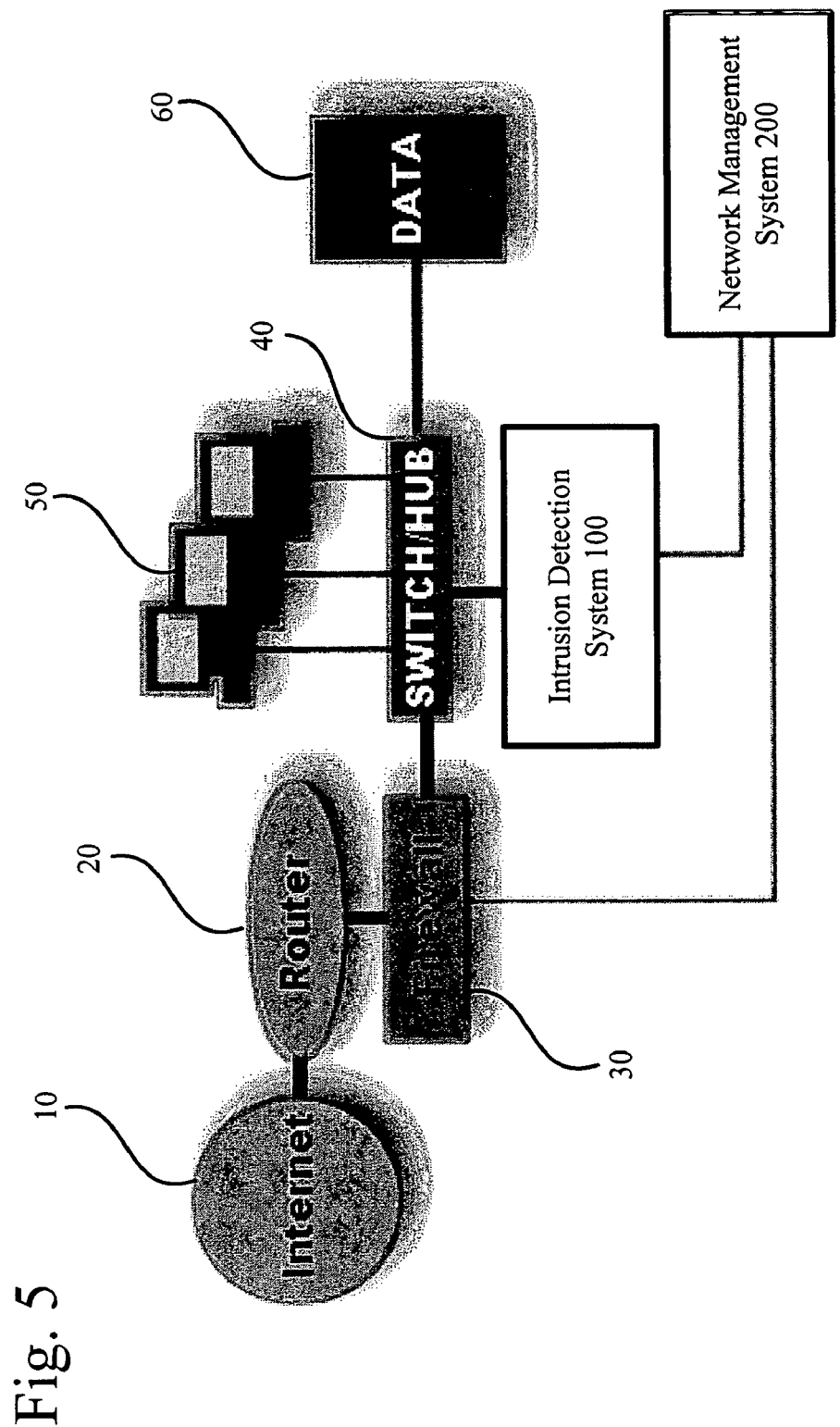
FIG. 5 is an illustrative network including a threat detection system and threat management system in accordance with one embodiment of the invention.

Returning to the various configurations for use of the threat detection system and threat management system, FIG. 5 is an illustrative network in accordance with one embodiment of the invention. As shown in FIG. 5, threat detection system 100 is deployed in an "offline" configuration. In this configuration, as shown in FIG. 5, threat detection system 100 is connected to a manageable network switch/hub 40. Threat detection system monitors all network traffic via a single mirror port or hub connection, but does not sit inline with the network flow. Accordingly, in this embodiment, threat detection system 100 response capabilities are limited to issuing alerts or blocking network access by turning off a switch port.

It should be appreciated that when the threat detection system is not positioned between the source of malicious traffic and the target, it may communicate with other parts of the network in order to prevent the attack. In the embodiment, the threat detection system may include a module for communicating with switch hardware over a serial interface. Using the administrative commands of the switch's command-line or menu-based serial interface, the switch control module polls the switch to maintain a cached copy of the switch's mac-to-port associations. Port locations may change when cables are moved around, so learned associations are timed out. If malicious traffic is detected to be originating from a particular mac address, the detection code may request that the switch control module disable that port. When the switch control module receives such a request, it checks its cached database for the mac address. If it is known and not timed out, commands are issued over the serial interface to disable the port immediately. Otherwise, the attached switches are polled again to refresh the database, and if the mac's location is still known its port is then disabled. A similar process may be employed for re-enabling ports, except that macs associated with disabled ports are remembered indefinitely so that they may be re-enabled by user request.

Additionally, each type of switch may require custom support. The design of the switch control module uses an abstraction layer so that the core control code uses the same interface to control any type of switch, while the individual switch drivers are responsible for translating generic requests to the specific byte sequences necessary to work with a particular model of switch. With this design, new switch models are easily supported by plugging in a new translation module. When learning mac/port associations, some ports may be found with multiple macs attached. This situation generally indicates that the port in question is a link to another switch or hub, and thus maintains LAN connectivity for multiple machines. For cases like this, the port may be marked as a "gateway" port so that a request to disable an individual mac does not sever network connectivity for an entire group of machines.

Most managed switches support a secure mode, where each port is locked down to only transmit traffic from the Ethernet addresses configured for that port. This mode is useful because it prevents an entire class of attacks based on mac address spoofing. The switch control module supports a mode to help use this feature: When the switch control module is asked to convert a port to secure mode, it sends commands to the switch to enable secure mode for that port, using the cached mac address in its database. It should be appreciated that similar control functions may be used to control other switch interfaces and other network infrastructure devices, such as SNMP, telnet, or ssh.

Figure 6:
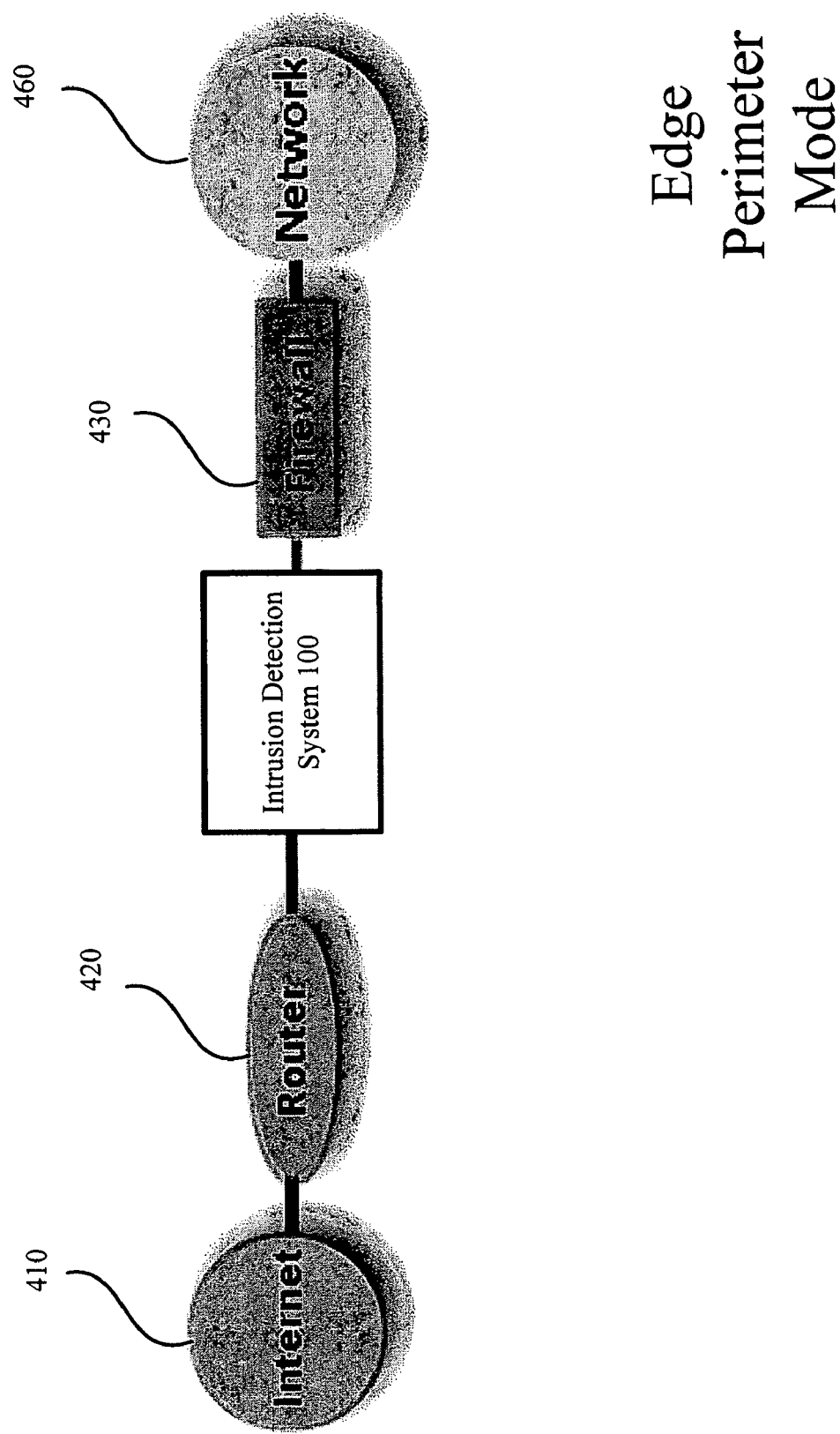
FIG. 6 is an illustrative network including an threat detection system and threat management system in accordance with one embodiment of the invention.

FIG. 6 is an illustrative network including an threat detection system and threat management system in accordance with one embodiment of the invention. As shown in FIG. 6, threat detection system 100 is deployed in an "edge" or "perimeter" configuration. In this embodiment, threat detection system 100 is placed between router 420 and firewall 430 to detect and respond to DoS attacks, port scans, and other externally initiated attacks. As shown, threat detection system 100 protects the target network's main Internet connection from attack.

Figure 7:
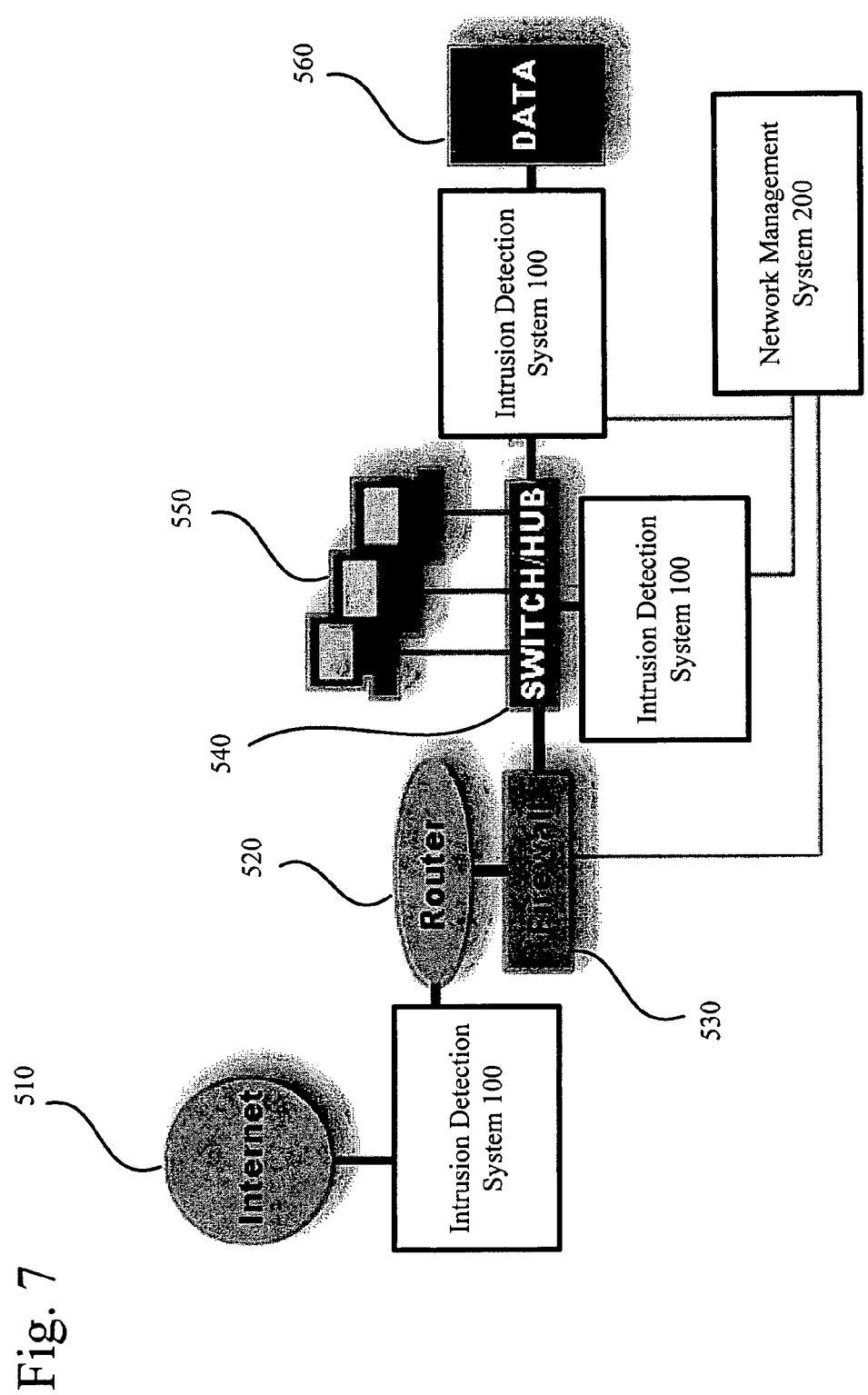
FIG. 7 is an illustrative network including an threat detection system and threat management system in accordance with one embodiment of the invention.

FIG. 7 is an illustrative network including an threat detection system and threat management system in accordance with one embodiment of the invention. As shown in FIG. 7, threat detection system 100 is deployed in an "enterprise" configuration. As shown in FIG. 7 and described above, multiple threat detection systems 100 may be deployed across an enterprise to protect various segments of the network, from the perimeter, to key switches/hubs or critical servers and subnets. An individual threat detection system is placed in an "inline" configuration between switch/hub 540 and data 560, while another threat detection system sits "offline" from switch/hub 540. Another sits outside of firewall 530 and protects the target network from the "perimeter" or "edge." All are controlled and managed by threat management system 200.

Figure 8:
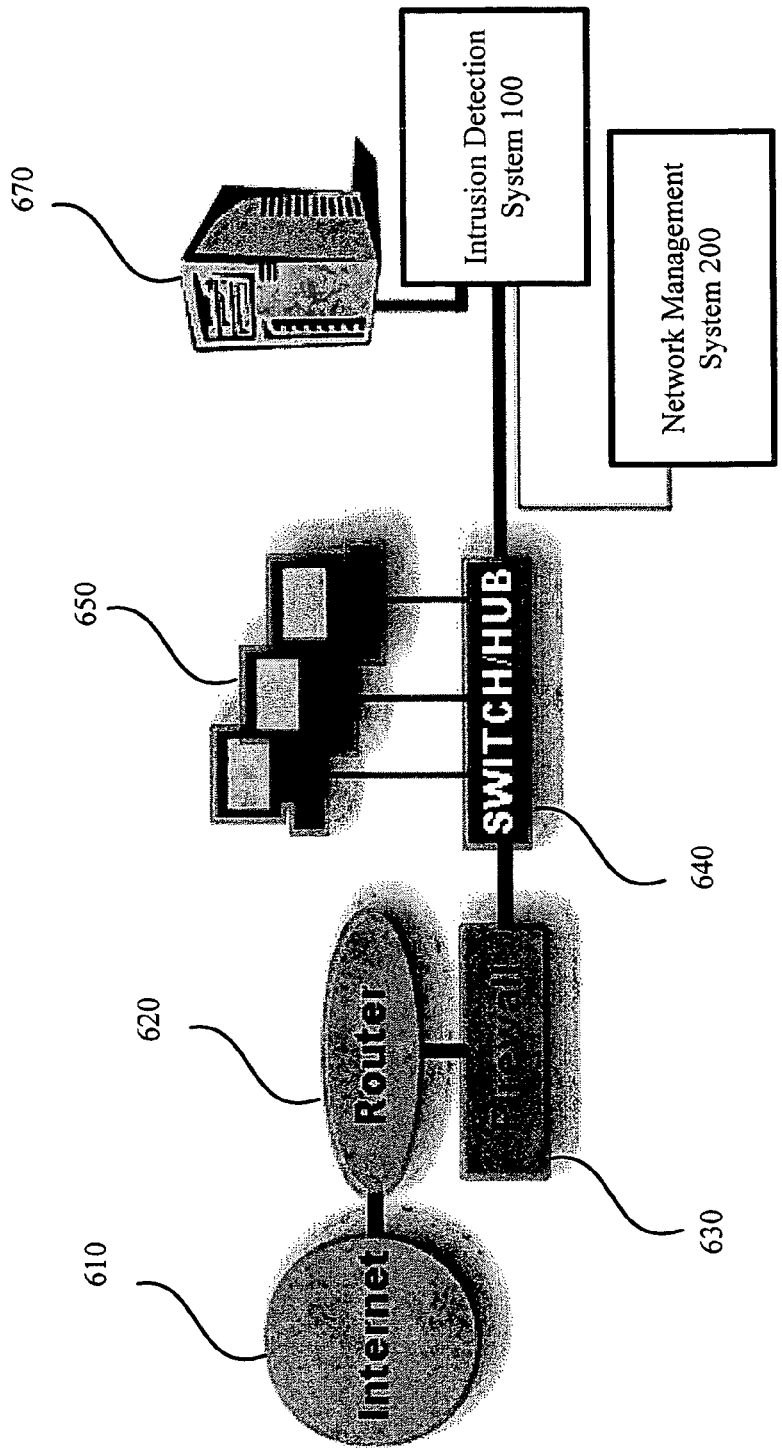
FIG. 8 is an illustrative network including an threat detection system and threat management system in accordance with one embodiment of the invention.

FIG. 8 is an illustrative network including an threat detection system and threat management system in accordance with one embodiment of the invention. As shown in FIG. 8, a threat detection system 100 may be deployed in a "blade server" configuration. In this configuration, the system fits into a standard PCI slot on a host system and functions independently, drawing only electrical power from the host.

Figure 9:
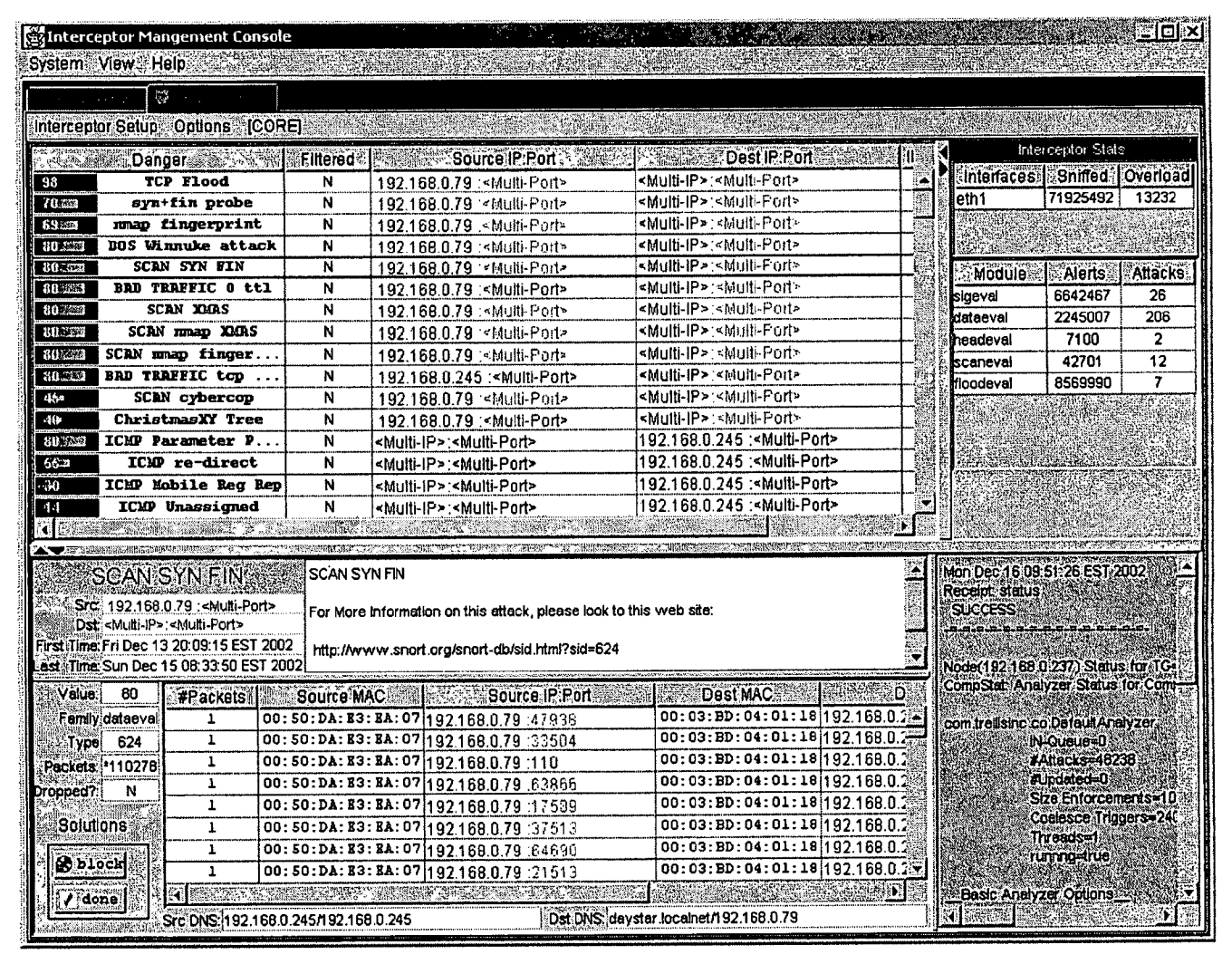

FIG. 9 is an illustrative user interface for the threat management system of FIG. 2 in accordance with one embodiment of the invention. As shown in FIG. 9, the administrator can view events detected one or many threat detection systems, depending on the number of those being monitored by the threat management system. The alert portion of the user interface shows attacks that the threat detection system has detected, as well as the overall statistics on traffic and attacks seen by the selected threat detection system. The administrator can also highlight a single attack to review the full details of that attack. The user interface also displays administration messages. The user interface also provides access to all administration and management options. Each user interface may act as a central management point for threat detection administration (e.g., setting the parameters used in some of the threat analysis modules, etc).

The user interface may also provide reporting features that allow historical attack information to be viewed in tabular reports or summarized in a variety of graphs. These reports allow the administrator to view historical attack information by threat, time, or other parameters. For a graphical view of historical attacks, several configurable graphs are provided. These historical reporting tools allow the administrator to easily view longer-term trends of attacks, attackers, and other relevant threat information.

A threat detection device is also disclosed in accordance with one embodiment of the invention. The threat detection device may utilize a disk-on-a-chip configuration in which the operating system and software reside on a solid-state disk-on-a-chip. In this respect, the device comprises a secure network card that may inserted into a PCI slot on an individual host or server for individualized protection, wherein the chip is connected to a blade.

In at least one embodiment, the operating system and software are divided using the standard PC hard disk partitioning scheme into four primary partitions. The first 512 bytes of the chip contain the boot sector and a table indicating where the four primary partitions begin. These four partitions, along with the boot sector, contain all the information on the chip. The first partition contains a Linux filesystem. This filesystem carries all the information needed to bootstrap the OS, including the bootloader, the operating system kernel, the busybox utility, and an initial boot script. The second partition is not formatted with a filesystem. Rather, it contains a complete OS image in the form of a compressed tarball. The third partition is similar to the second, but the compressed tarball contains all files that have been customized for this particular machine. The fourth filesystem is also a Linux filesystem which is used by the threat detection process at runtime to store persistent configuration state. Apart from system upgrades, the first two partitions are read-only, and the third is written only during initial setup. A journaling filesystem is used in its most conservative configuration for the fourth, and it only holds files that must be modified at runtime. In at least one embodiment of the invention, the operating system comprises a hardened Debian Linux operating system.

At boot time, the system BIOS loads the bootloader from the boot sector. The bootloader loads its second stage from the first partition, reads its configuration, loads the Linux kernel, and transfers control to it. Linux mounts the first partition read-only and runs a startup script from it. The startup script uses busybox to create an in-memory tmpfs filesystem, and populates it with the OS image on the second partition. It is then overlays the data from the third partition onto the tmpfs. Finally, it uses the Linux pivot_root call to make the tmpfs the system's root filesystem. At this point, a standard linux system exists in tmpfs and control is transferred to it. It unmounts the first partition and continues the boot process. At this point, the system exists entirely within memory and is not directly using any data on the flash chip. Latter stages of the boot process mount the fourth flash disk partition to hold the threat detection process's runtime state.

The operating system image is stored on the chip's second partition. The few files that store system configuration information or per-machine cryptographic data are manipulated by well-defined interfaces from the network management system and are saved in the customization area on the third partition. These files include the system password database, the system ssh host key, and authorized ssh public keys. Given that flash memory can be written a limited number of times, the per-machine data in the third partition is only written when necessary. This is implemented by keeping a list of those files in the in-memory tmpfs which should be saved to flash. A simple write-flash script is used to read that list, then tar up those files and store them on the third partition. In this way, the number of flash writes done for the third partition is limited.

Although certain aspects of the invention have been described utilizing network connections, any suitable communication interface, Ethernet connection, modem, telephone, digital or analog connections with the system using wireless communication devices (i.e., mobile phones, PDAs, or other handheld wireless communication devices), token ring, Internet or Intranet or other computer or electronic connection, or any other suitable network connection may be utilized in various communications within the scope of the invention.

The systems of the invention or subportions thereof, may take the form of a "processing machine," such as a general purpose computer or other network operating system in certain embodiments of the invention. A "processing machine" may include at least one processor that uses at least one memory. This may include any x86 hardware and x86 server blade hardware for running the operating systems of the invention. That at least one memory may store a set of instructions, routines or modules, for implementing the processes of the invention. These items may be either permanently or temporarily stored in the memory or memories of the processing machine. The processor executes the instructions that are stored in the memory or memories in order to process data. The set of instructions may include various instructions that perform a particular task or tasks, such as those tasks and actions described above. The sets of instructions for performing a particular task may be characterized as a program, software program, or software. The software may be in the form of system software, application software, a collection of separate programs, a program module within a larger program, or a portion of a program module, for example The software used might also include modular programming in the form of object oriented programming.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable. Also, the instructions and/or data used in the practice of the invention may utilize any compression or encryption technique or algorithm, as may be desired. An encryption module might be used to encrypt data. Further, files or other data may be decrypted using a suitable decryption module, for example. Accordingly, the processing of data may be in response to commands by a user or users of the processing machine, in response to previous processing, in response to a request by another processing machine and/or any other input.

As stated above, the processing machine used to implement the invention may be a general purpose computer. However, the processing machine described above may also utilize any of a wide variety of other technologies including a special purpose computer, a computer system including a microcomputer, mini-computer or mainframe for example, a programmed microprocessor, a micro-controller, an integrated circuit, a logic circuit, a digital signal processor, a programmable logic device, or any other device or arrangement of devices that is capable of implementing the steps of the process of the invention.

It is appreciated that in order to practice the method of the invention as described above, it is not necessary that the processors and/or the memories of the processing machine be physically located in the same geographical place. That is, each of the processors and the memories used in the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, an Intranet, an Extranet, LAN, WAN, VAN, VPN, an Ethernet, or any client server architecture or system that enables communication, for example. Such communications technologies may use any suitable protocol, such as those described herein.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may be in the form of a web page or other interactive application presented on a user system by the user's browser, for example. The web page or application could include fields for accepting data and transmitting data to the system for storage. A user interface may also include any of a mouse, touch screen, keyboard, keypad, card slot, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

Many embodiments and adaptations of the present invention other than those herein described, will be apparent to those skilled in the art by the foregoing description thereof, without departing from the substance or scope of the invention. While the present invention has been described herein in detail in relation to its exemplary embodiments, it is to be understood that this disclosure is only illustrative and exemplary of the present invention. Accordingly, the foregoing disclosure is not intended to limit the scope of the present invention which is defined by the claims and their equivalents.

What is claimed is:

1. A method for analyzing a network packet received from a remote source and destined for a network resource, the network packet having associated packet data, and for identifying a plurality of network threats, comprising:
    (a) comparing the packet data to a predetermined set of protocol anomalies, each protocol anomaly indicative of at least one of the plurality of network threats;
    (b) comparing the packet data to a predetermined set of threat signatures, each threat signature indicative of at least one of the plurality of network threats;
    (c) comparing a first port weighting for the network resource to a default port weighting, the first port weighting generated in part based on the packet data and common port usage;
    (d) comparing a first source weighting for the remote source to a default source weighting, the first source weighting generated in part based on the packet data;
    (e) comparing the packet data to a predetermined set of permissions;
    (f) determining that the network packet is associated with an existing network threat based on at least one of the comparison of the packet data to the predetermined set of protocol anomalies, the comparison of the packet data to the predetermined set of threat signatures, the comparison of the first port weighting to the default port weighting, the comparison of the first source weighting to the default source weighting, the comparison of the packet data to the predetermined set of permissions; and
    (g) taking at least one of a plurality of actions in response to the existing network threat.

2. The method of claim 1, wherein the comparison of the packet data to the predetermined set of protocol anomalies further comprises:
    determining that the packet data includes at least one of the protocol anomalies from the predetermined set of protocol anomalies.

3. The method of claim 1, wherein the comparison of the packet data to the predetermined set of threat signatures further comprises:
    determining that the packet data includes at least one of the threat signatures from the predetermined set of threat signatures.

4. The method of claim 1, wherein the predetermined set of threat signatures is organized into at least one super set, at least one sub set, and at least one common set.

5. The method of claim 4, wherein the comparison of the packet data to the predetermined set of threat signatures further comprises:
    determining that the packet data includes at least one of the threat signatures from the super set.

6. The method of claim 5, wherein the comparison of the packet data to the predetermined set of threat signatures further comprises:
    determining that the packet data includes at least one of the threat signatures from the sub set.

7. The method of claim 6, wherein the comparison of the packet data to the predetermined set of threat signatures further comprises:
    determining that the packet data includes at least one of the threat signatures from the common set.

8. The method of claim 1, wherein the comparison of the first port weighting to the default port weighting further comprises:
    determining that the network packet is associated with a first port scan based on the comparison of the first port weighting to the default port weighting.

9. The method of claim 1, wherein the comparison of the first source weighting to the default source weighting further comprises:
    determining that the network packet is associated with a denial of service attack based on the comparison of the first source weighting to the default source weighting.

10. The method of claim 1, wherein the comparison of the packet data to the predetermined set of permissions further comprises:
    determining that the packet data fails to demonstrate that the remote source has a requisite permission for connection to the network resource.

11. The method of claim 1, wherein the at least one of the plurality of actions comprises alerting a network management system.

12. The method of claim 1, wherein the at least one of the plurality of actions comprises rejecting the network packet.

13. The method of claim 1, wherein the at least one of the plurality of actions comprises blocking network traffic from the remote source.

14. The method of claim 1, wherein the at least one of the plurality of actions comprises filtering port scan activity.

15. The method of claim 1, wherein the at least one of the plurality of actions comprises throttling network traffic to the network resource.

16. The method of claim 1, wherein the at least one of the plurality of actions comprises throttling network traffic received from to the remote source.

17. The method of claim 1, wherein the at least one of the plurality of actions comprises disabling a network port associated with the network resource.

18. The method of claim 1, further comprising:
generating an acknowledgment message to the remote source;
determining that the remote source failed to return a confirmation message; and
determining that the network packet is associated with an existing network threat based on the determining that the remote source failed to return a confirmation message.

19. The method of claim 1, further comprising:
comparing the packet data to a first behavior model;
determining that the network packet is associated with an existing network threat based on the comparison of the packet data to the first behavior model.

20. The method of claim 19, wherein the first behavior model is repeatedly updated at a predetermined interval in runtime.

21. The method of claim 1, wherein the existing network threat comprises a port scan.

22. The method of claim 1, wherein the existing network threat comprises a denial of service attack.

23. A network threat detection and response system for analyzing a network packet received from a remote source and destined for a network resource, the network packet having associated packet data, and for identifying a plurality of network threats, comprising:
(a) a first portion adapted for comparing the packet data to a predetermined set of protocol anomalies, each protocol anomaly indicative of at least one of the plurality of network threats;
(b) a second portion adapted for comparing the packet data to a predetermined set of threat signatures, each threat signature indicative of at least one of the plurality of network threats;
(c) a third portion adapted for comparing a first port weighting for the network resource to a default port weighting, the first port weighting generated in part based on the packet data;
(d) a fourth portion adapted for comparing a first source weighting for the remote source to a default source weighting, the first source weighting generated in part based on the packet data;
(e) a fifth portion adapted for comparing the packet data to a predetermined set of permissions;
(f) a sixth portion adapted for determining that the network packet is associated with an existing network threat based on at least one of the comparison of the packet data to the predetermined set of protocol anomalies, the comparison of the packet data to the predetermined set of threat signatures, the comparison of the first port weighting to the default port weighting, the comparison of the first source weighting to the default source weighting, the comparison of the packet data to the predetermined set of permissions; and
(g) a seventh portion adapted for taking at least of one of a plurality of actions in response to the existing network threat.

24. The system of claim 23, wherein the first portion is further adapted for determining that the packet data includes at least one of the protocol anomalies from the predetermined set of protocol anomalies.

25. The system of claim 23, wherein the second portion is further adapted for determining that the packet data includes at least one of the threat signatures from the predetermined set of threat signatures.

26. The system of claim 23, wherein the predetermined set of threat signatures is organized into at least one super set, at least one sub set, and at least one common set.

27. The system of claim 26, wherein the second portion is further adapted for determining that the packet data includes at least one of the threat signatures from the super set.

28. The system of claim 27, wherein the second portion is further adapted for determining that the packet data includes at least one of the threat signatures from the sub set.

29. The system of claim 28, wherein the second portion is further adapted for determining that the packet data includes at least one of the threat signatures from the common set.

30. The system of claim 23, wherein the third portion is further adapted for determining that the network packet is associated with a first port scan based on the comparison of the first port weighting to the default port weighting.

31. The system of claim 23, wherein the fourth portion is further adapted for determining that the network packet is associated with a denial of service attack based on the comparison of the first source weighting to the default source weighting.

32. The system of claim 23, wherein the fifth portion is further adapted for determining that the packet data fails to demonstrate that the remote source has a requisite permission for connection to the network resource.

33. The system of claim 23, wherein the at least one of the plurality of actions comprises alerting a network management system.

34. The system of claim 23, wherein the at least one of the plurality of actions comprises rejecting the network packet.

35. The system of claim 23, wherein the at least one of the plurality of actions comprises blocking network traffic from the remote source.

36. The system of claim 23, wherein the at least one of the plurality of actions comprises filtering port scan activity.

37. The system of claim 23, wherein the at least one of the plurality of actions comprises throttling network traffic to the network resource.

38. The system of claim 23, wherein the at least one of the plurality of actions comprises throttling network traffic received from to the remote source.

39. The system of claim 23, wherein the at least one of the plurality of actions comprises disabling a network port associated with the network resource.

40. The system of claim 23, further comprising:
an eighth portion adapted for generating an acknowledgment message to the remote source, determining that the remote source failed to return a confirmation message, and determining that the network packet is associated with an existing network threat based on the determining that the remote source failed to return a confirmation message.

41. The system of claim 23, further comprising:
a ninth portion adapted for comparing the packet data to a first behavior model, and determining that the network packet is associated with an existing network threat based on the comparison of the packet data to the first behavior model.

42. The system of claim 41, wherein the first behavior model is repeatedly updated at a predetermined interval in runtime.

43. A method for analyzing a network packet received from a remote source and destined for a network resource, the network packet having associated packet data, and for identifying a plurality of network threats, comprising:
- (a) comparing the packet data to a predetermined set of protocol anomalies, each protocol anomaly indicative of at least one of the plurality of network threats;
  determining that the packet data includes at least one of the protocol anomalies from the predetermined set of protocol anomalies;
- (b) comparing the packet data to a predetermined set of threat signatures, each threat signature indicative of at least one of the plurality of network threats;
  determining that the packet data includes at least one of the threat signatures from the predetermined set of threat signatures;
- (c) utilizing the packet data to generate a first port weighting for the network resource;
  determining that the network packet is associated with a first port scan based on a comparison of the first port weighting to a default port weighting;
- (d) utilizing the packet data to generate a first source weighting for the remote source;
  determining that the network packet is associated with a denial of service attack based on a comparison of the first source weighting to a default source weighting;
- (e) comparing the packet data to a predetermined set of permissions;
  determining that the packet data fails to demonstrate that the remote source has a requisite permission for connection to the network resource;
- (f) associating the network packet with an existing network threat based on at least one of the determining that the packet data includes at least one of the protocol anomalies from the predetermined set of protocol anomalies, determining that the packet data includes at least one of the threat signatures from the predetermined set of threat signatures, determining that the network packet is associated with a first port scan, determining that the network packet is associated with a denial of service attack, determining that the packet data fails to demonstrate that the remote source has a requisite permission for connection to the network resource; and
- (g) taking one of a plurality of actions in response to the existing network threat.

44. A device for analyzing a network packet received from a remote source and destined for a network resource, the network packet having associated packet data, and for identifying a plurality of network threats, comprising:
- (a) a first portion adapted for comparing the packet data to a predetermined set of protocol anomalies, each protocol anomaly indicative of at least one of the plurality of network threats;
- (b) a second portion adapted for comparing the packet data to a predetermined set of threat signatures, each threat signature indicative of at least one of the plurality of network threats;
- (c) a third portion adapted for comparing a first port weighting for the network resource to a default port weighting, the first port weighting generated in part based on the packet data;
- (d) a fourth portion adapted for comparing a first source weighting for the remote source to a default source weighting, the first source weighting generated in part based on the packet data;
- (e) a fifth portion adapted for comparing the packet data to a predetermined set of permissions;
- (f) a sixth portion adapted for determining that the network packet is associated with an existing network threat based on at least one of the comparison of the packet data to the predetermined set of protocol anomalies, the comparison of the packet data to the predetermined set of threat signatures, the comparison of the first port weighting to the default port weighting, the comparison of the first source weighting to the default source weighting, the comparison of the packet data to the predetermined set of permissions; and
- (g) a seventh portion adapted for taking at least of one of a plurality of actions in response to the existing network threat.

45. The device of claim 44, further comprising:
an eighth portion adapted for generating an acknowledgment message to the remote source, determining that the remote source failed to return a confirmation message, and determining that the network packet is associated with an existing network threat based on the determining that the remote source failed to return a confirmation message.

46. The device of claim 44, further comprising:
a ninth portion adapted for comparing the packet data to a first behavior model, and determining that the network packet is associated with an existing network threat based on the comparison of the packet data to the first behavior model.

47. The device of claim 44, wherein the device comprises a server blade.

48. The device of claim 44, wherein the device resides on a flash memory.

49. The device of claim 44, wherein the device resides on a disk-on-a-chip.

50. The device of claim 44, wherein the device resides on a disk-on-a-chip that is connectable to an IDE socket of a server.

51. The device of claim 44, wherein the device resides on a disk-on-a-chip installed on a computer blade that is insertable into a PCI slot on an individual host or server.

52. A device for analyzing a network packet received from a remote source and destined for a network resource, the network packet having associated packet data, and for identifying a plurality of network threats, the device comprising:
a component selected from the set consisting of a flash memory and a disk-on-a-chip, the component including at least one of the set consisting of
  an anomaly assessment portion adapted for comparing the packet data to a predetermined set of protocol anomalies, each protocol anomaly indicative of at least one of the plurality of network threats,
  a signature threat assessment portion adapted for comparing the packet data to a predetermined set of threat signatures, each threat signature indicative of at least one of the plurality of network threats,
  a port weighting assessment portion adapted for comparing a first port weighting for the network resource to a default port weighting, the first port weighting generated in part based on the packet data and common port usage,
  a source weighting assessment portion adapted for comparing a first source weighting for the remote source to a default source weighting, the first source weighting generated in part based on the packet data, a permission assessment portion adapted for comparing the packet data to a predetermined set of permissions that are specific to a person.

53. The device of claim 52, wherein the component further includes:

a portion adapted for determining that the network packet is associated with an existing network threat.

54. The device of claim 53, wherein the component further includes:

a portion adapted for taking at least of one of a plurality of actions in response to the existing network threat.

55. The device of claim 52, wherein the component is connectable to an IDE or SATA socket of a server.

56. The device of claim 52, wherein the component is installed on a computer blade that is insertable into a PCI slot on an individual host or server.

* * * * *